(12) United States Patent
Lydon et al.

(10) Patent No.: US 10,873,194 B2
(45) Date of Patent: Dec. 22, 2020

(54) DOCKING STATION FOR AUTONOMOUS MOBILE ROBOTS

(71) Applicant: iRobot Corporation, Bedford, MA (US)

(72) Inventors: Peter Lydon, Peabody, MA (US); Insun Hong, Somerville, MA (US); Andrew String, Lynnfield, MA (US); Jeffrey Curtis, Dunstable, MA (US); Travis Pierce, Bedford, NH (US)

(73) Assignee: iRobot Corporation, Bedford, MA (US)

( * ) Notice: Subject to any disclaimer, the term of this patent is extended or adjusted under 35 U.S.C. 154(b) by 236 days.

(21) Appl. No.: 16/032,761

(22) Filed: Jul. 11, 2018

(65) Prior Publication Data
US 2020/0021122 A1 Jan. 16, 2020

(51) Int. Cl.
*H02J 7/00* (2006.01)
*G05D 1/00* (2006.01)
*G05D 1/02* (2020.01)
*B60L 53/16* (2019.01)
*B60L 53/36* (2019.01)

(52) U.S. Cl.
CPC ............ *H02J 7/0044* (2013.01); *B60L 53/16* (2019.02); *B60L 53/36* (2019.02); *G05D 1/0088* (2013.01); *G05D 1/028* (2013.01); *G05D 1/0225* (2013.01); *G05D 2201/0208* (2013.01)

(58) Field of Classification Search
CPC ... Y02T 90/14; Y02T 10/7005; Y02T 90/128; Y02T 10/7088; Y02T 90/163; H02J 7/0044; B60L 53/36; B60L 53/16; G05D 1/0088; G05D 1/0225; G05D 1/028; G05D 2201/0208
See application file for complete search history.

(56) References Cited

U.S. PATENT DOCUMENTS

| 2003/0094922 | A1* | 5/2003 | Petersson ................ A47L 9/009 320/109 |
|---|---|---|---|
| 2014/0000231 | A1 | 1/2014 | Bernini |
| 2014/0327389 | A1 | 11/2014 | Elonsson |
| 2015/0328775 | A1 | 11/2015 | Shamlian et al. |
| 2016/0229060 | A1* | 8/2016 | Kim ................... A47L 11/4011 |
| 2017/0055796 | A1 | 3/2017 | Won et al. |

(Continued)

OTHER PUBLICATIONS

"Do what you love. Gardena Robotic Lawnmowers," Gardena product manual, 2019, 11 pages.
(Continued)

*Primary Examiner* — Arun C Williams
(74) *Attorney, Agent, or Firm* — Fish & Richardson P.C.

(57) ABSTRACT

A docking station for a robotic lawnmower includes a base, an electrical connector above the base and positioned along a longitudinal axis of the docking station, and a central guide member positioned on the base and along the longitudinal axis. The central guide member includes a right lateral surface extending away from the longitudinal axis and toward the electrical connector from a first end portion proximate the longitudinal axis to a second end portion, and a left lateral surface extending away from the longitudinal axis and toward the electrical connector from a first end portion proximate the longitudinal axis to a second end portion.

34 Claims, 17 Drawing Sheets

(56) References Cited

U.S. PATENT DOCUMENTS

2018/0014709 A1   1/2018  O'Brien et al.

OTHER PUBLICATIONS

"Operator's manual, Husqvarna Automower 550H," Husqvarna, 2019, 56 pages.
"Robomow," Robomow S Models, product manual, 2016, 62 pages.
"Worx," Landroid, Unmanned Mowing Vehichle, product manual, 2015, 52 pages.
International Search Report and Written Opinion in Appln. No. PCT/US2019/40084, dated Oct. 16, 2019, 13 pages.

* cited by examiner

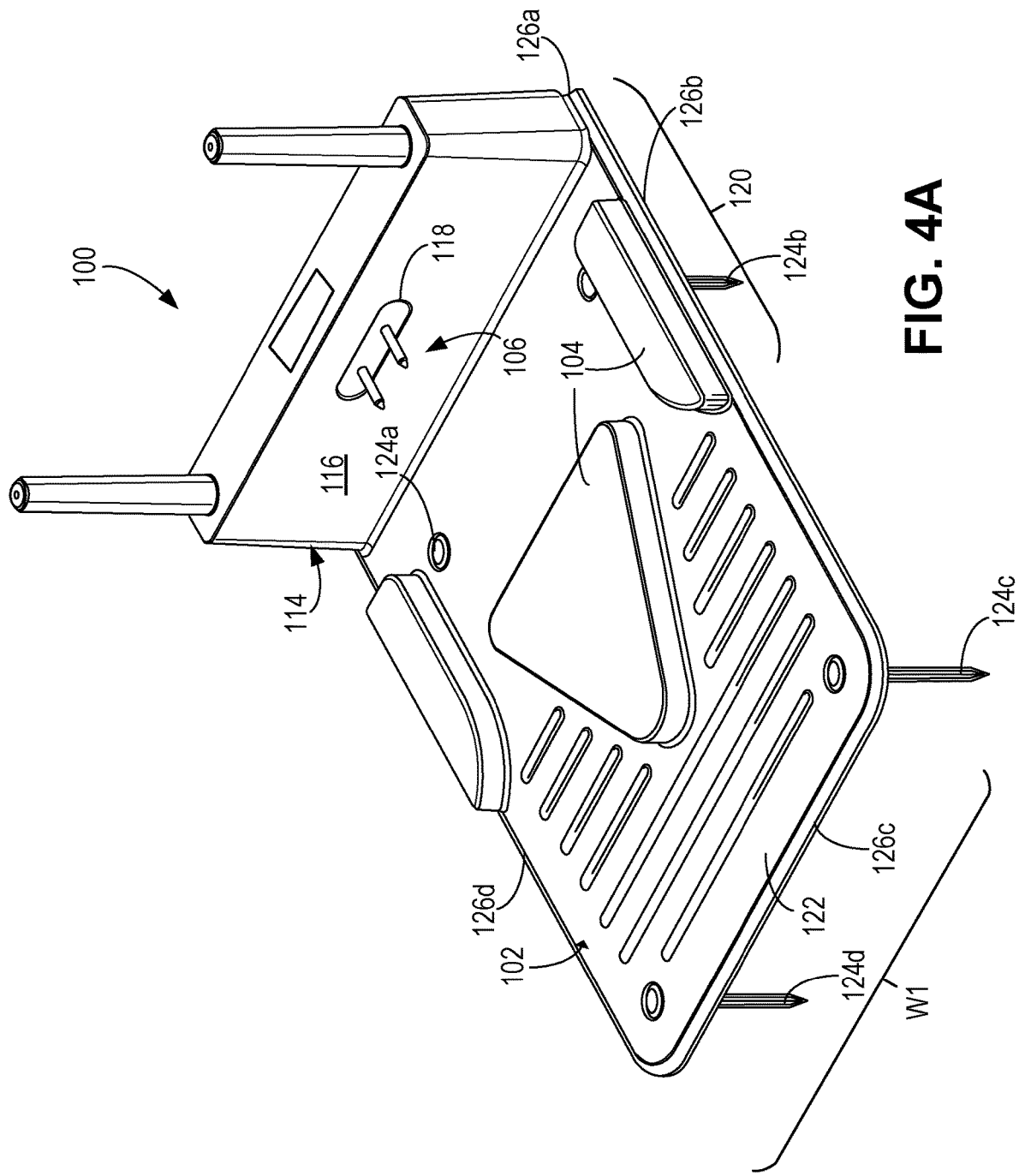

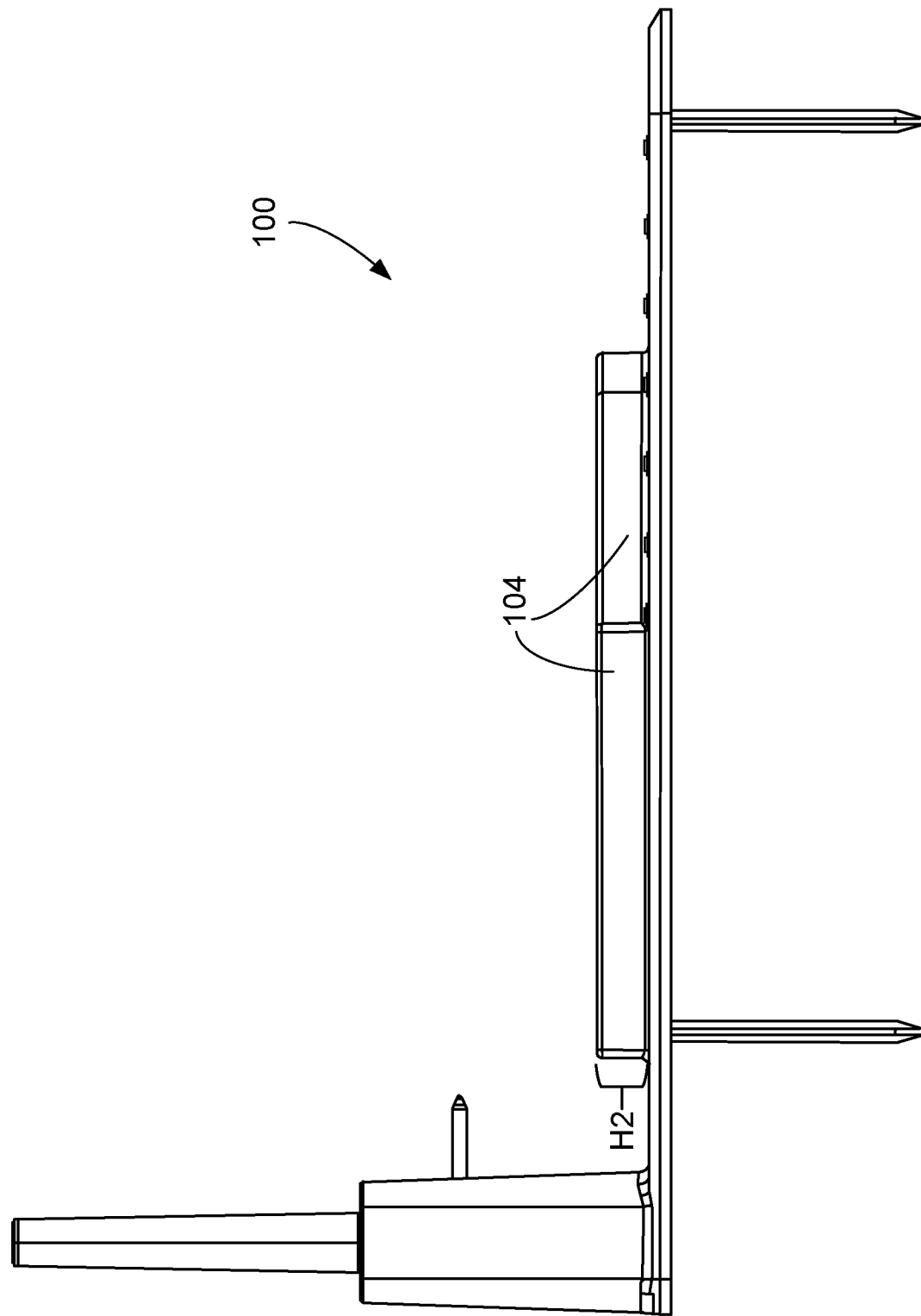

DOCKING STATION FOR AUTONOMOUS MOBILE ROBOTS

TECHNICAL FIELD

This specification relates to docking stations, in particular, for autonomous mobile robots.

BACKGROUND

An autonomous robotic lawnmower can navigate about an environment to mow a lawn. After the robotic lawnmower initiates a cutting operation, the robotic lawnmower autonomously controls rotation of blades to mow the lawn as the robotic lawnmower autonomously navigates about the lawn. A user may manually interact with the robotic lawnmower to reposition or to reorient the robotic lawnmower. Upon completion of the cutting operation, the robotic lawnmower can return to a docking station to charge a battery of the robotic lawnmower.

SUMMARY

The systems, devices, methods, and other features described herein can include the advantages below and described herein elsewhere. For example, the features described herein can improve the efficiency and performance of autonomous robotic lawnmowers, docking stations, and related methods and processes.

The guide mechanism of the docking station can allow the robotic lawnmower to more quickly dock with the docking station. Rather than having to rely exclusively on localization and mapping methods that can be prone to error, the robotic lawnmower can be navigated to a general area of the docking station and then can move along physical features of the docking station to precisely align the electrical connector of the robotic lawnmower with the electrical connector of the docking station. The robotic lawnmower can autonomously dock with the docking station without user intervention to align the robotic lawnmower with the docking station or without any other manual movement of the robotic lawnmower to ensure proper docking. In addition, the use of such physical guiding features can be relatively inexpensive compared to high-resolution sensing systems that would allow the robotic lawnmower to precisely determine its location relative to the docking station.

The robotic lawnmower can also reliably undock from the docking station. In particular, the guide mechanism can reduce the risk of that the robotic lawnmower can become stuck to the docking station. For example, in certain examples, wheels of wheel assemblies of a robotic lawnmower can become stuck on features of a docking station. The guide mechanism of the docking station described herein can orient the wheels of the wheel assemblies of the robotic lawnmower to orientations defined by the guide mechanism, e.g., defined by physical features of the guide mechanism. In particular, when the wheels are in these defined orientations, a rolling direction of the wheels is aligned with the forward drive direction of the robotic lawnmower, thus reducing the risk of wheel drag along a base of the docking station as the robotic lawnmower moves across the base of the docking station.

Furthermore, the docking station can have a smaller form factor than conventional docking stations. For example, rather than only contacting outside portions of the wheel assemblies to guide movement of the wheel assemblies, the guide mechanism contacts inside portions of the wheel mechanisms. As a result, the guide mechanism can decrease a width needed for the docking station to guide the wheel assemblies into defined orientations and positions.

The docking stations and robotic lawnmowers described herein can also enable the electrical connectors of the docking station and the robotic lawnmower to more reliably engage with one another. One of the electrical connectors can include an electrical terminal including multiple contact arms that independently deflect relative to one another. As a result, each of the contact arms of the one of the electrical terminal can independently engage with the other of the electrical connectors.

In one aspect, a docking station for a robotic lawnmower includes a base, an electrical connector above the base and positioned along a longitudinal axis of the docking station, and a central guide member positioned on the base and along the longitudinal axis. The central guide member includes a right lateral surface extending away from the longitudinal axis and toward the electrical connector from a first end portion proximate the longitudinal axis to a second end portion, and a left lateral surface extending away from the longitudinal axis and toward the electrical connector from a first end portion proximate the longitudinal axis to a second end portion. The docking station further includes a right lateral guide member positioned on the base and adjacent to a right edge of the base, and a left lateral guide member positioned on the base and adjacent to a left edge of the base. The right lateral guide member and the central guide member at least partially define a right channel positioned between the right lateral guide member and the central guide member and extending along the base. The left lateral guide member and the central guide member at least partially define a left channel positioned between the left lateral guide member and the central guide member and extending along the base. The central guide member is positioned between the right lateral guide member and the left lateral guide member.

In another aspect, a docking station for a robotic lawnmower includes an electrical connector above the base and positioned along a longitudinal axis of the docking station, and a central guide member positioned on the base and along the longitudinal axis. The central guide member includes a right lateral surface extending away from the longitudinal axis and toward the electrical connector from a first end portion proximate the longitudinal axis to a second end portion, and a left lateral surface extending away from the longitudinal axis and toward the electrical connector from a first end portion proximate the longitudinal axis to a second end portion.

In another aspect, a docking station for a robotic lawnmower includes an electrical connector above the base and positioned along a longitudinal axis of the docking station, and a central guide member positioned on the base and along the longitudinal axis. The central guide member includes a right lateral surface extending away from the longitudinal axis and toward the electrical connector from a first end portion proximate the longitudinal axis to a second end portion, and a left lateral surface extending away from the longitudinal axis and toward the electrical connector from a first end portion proximate the longitudinal axis to a second end portion.

In another aspect, a system includes a docking station including an electrical connector and a guide mechanism. The electrical connector is configured to interface with an electrical connector of a robotic lawnmower. The guide mechanism is configured to contact a right portion of a left wheel assembly of the robotic lawnmower to move the left wheel assembly leftward such that the electrical connector of the robotic lawnmower aligns with the electrical connector of the docking station. The guide mechanism is configured to contact a left portion of a right wheel assembly of the robotic lawnmower to move the right wheel assembly rightward such that the electrical connector of the robotic lawnmower aligns with the electrical connector of the docking station.

In another aspect, a method of docking a robotic lawnmower with a docking station is featured. The method includes navigating the robotic lawnmower about a mowable area to mow the mowable area based on detecting radiofrequency signals emitted by beacons, and docking the robotic lawnmower with the docking station. Docking the robotic lawnmower includes determining a heading of the robotic lawnmower based on detecting a radiofrequency signal emitted by a beacon positioned on the docking station, and navigating the robotic lawnmower toward the docking station based on the detected radiofrequency signal.

Certain implementations can include one or more of the features described below and herein elsewhere.

In some implementations, an angle between the right lateral surface and the longitudinal axis is between 15 and 45 degrees.

In some implementations, the central guide member includes a rearward surface extending from proximate the second end portion of the right lateral surface to proximate the second end portion of the left lateral surface. The rearward surface can define a plane substantially perpendicular to the longitudinal axis.

In some implementations, the docking station includes elongate support members extending downwardly from the base. A first of the elongate support members can be positioned along a front-right portion of the base. A second of the elongate support members can be positioned along a front-left portion of the base. A third of the elongate support members can be positioned along a rear-right portion of the base. A fourth of the elongate support members is positioned along a rear-left portion of the base. In some implementations, the elongate support members are stakes.

In some implementations, a perimeter of the base is substantially rectangular, and the first, second, third, and fourth of the elongate support members are positioned proximate first, second, third, and fourth corners of the perimeter of the base, respectively.

In some implementations, the central guide member is substantially symmetric about the longitudinal axis.

In some implementations, the right lateral guide member and the left lateral guide member are symmetric to one another about the longitudinal axis.

In some implementations, the docking station further includes a backstop extending vertically from the base. The electrical connector can be positioned along a front facing surface of the backstop.

In some implementations, the docking station further includes a beacon for emitting a radiofrequency signal, the beacon being positioned on top of the backstop. In some implementations, the front facing surface of the backstop extends along a plane perpendicular to a plane along which a top surface of the base extends.

In some implementations, the right lateral guide member includes a front curved surface extending laterally toward the longitudinal axis away from the right edge of the base, and the left lateral guide member includes a front curved surface extending laterally toward the longitudinal axis away from the left edge of the base. In some implementations, the right lateral guide member includes a lateral planar surface extending rearward from the front curved surface of the right lateral guide member toward the electrical connector, and the left lateral guide member includes a lateral planar surface extending rearward from the front curved surface of the left lateral guide member toward the electrical connector. In some implementations, the front curved surface of the right lateral guide member and the front curved surface of the left lateral guide member extend vertically from the base.

In some implementations, the right lateral guide member includes a rearward facing planar surface extending laterally from proximate the right edge of the base toward the longitudinal axis, and the left lateral guide member includes a rearward facing planar surface extending laterally from proximate the left edge of the base toward the longitudinal axis. In some implementations, a backstop of the docking station and the rearward facing surface of the right lateral guide member at least partially define a rearward right channel extending from a central collection well to the right edge of the base, and the backstop and the rearward facing surface of the left lateral guide member at least partially define a rearward left channel extending from the central collection well to the left edge of the base.

In some implementations, a distance between a forwardmost portion of the central guide member and a forwardmost portion of the base is 20% to 40% of an overall length of the docking station.

In some implementations, a maximum width between the right lateral surface of the central guide member and the left lateral surface of the central guide member is between 40% and 60% of an overall width of the docking station.

In some implementations, an overall width of the docking station is between 100% and 125% of an overall width of the robotic lawnmower.

In some implementations, configurations of the guide mechanism to contact the right portion of the left wheel assembly include configurations to contact the left wheel assembly such that the left wheel assembly rotates about a first substantially vertical axis to align with a first channel along a base of the docking station. Configurations of the guide mechanism to contact the left portion of the right wheel assembly can include configurations to contact the right wheel assembly such that the right wheel assembly rotates about a second substantially vertical axis to align with a second channel along the base of the docking station.

In some implementations, the electrical connector of the docking station is positioned along a longitudinal axis of the docking station. The guide mechanism can include a guide member including a first surface configured to contact the right portion of the left wheel assembly and a second surface configured to contact the left portion of the right wheel assembly. The first surface and the second surface can be nonparallel to one another and nonparallel to the longitudinal axis of the docking station. In some implementations, an angle between the first surface and the longitudinal axis of the docking station is between 15 and 45 degrees.

In some implementations, the guide mechanism can include a guide member including a substantially triangular prismatic portion configured to contact the right portion of the left wheel assembly and configured to contact the left portion of the right wheel assembly.

In some implementations, a height of the guide mechanism relative to a base of the docking station is at least 2 centimeters.

In some implementations, the electrical connector of the docking station is positioned on a rearward portion of the docking station. A distance between a forwardmost portion of the guide mechanism and a forwardmost portion of a base of the docking station can be 100% to 150% of a distance between a forwardmost portion of the robotic lawnmower and a rearwardmost portion of the left wheel assembly or the right wheel assembly.

In some implementations, the guide mechanism includes a first portion configured to contact the right portion of the left wheel assembly and configured to contact the left portion of the right wheel assembly. A maximum width of the first portion of the guide mechanism can be between 90% and 100% of a distance between the left wheel assembly and the right wheel assembly.

In some implementations, the guide mechanism includes a first portion configured to contact the right portion of the left wheel assembly and configured to contact the left portion of the right wheel assembly, and a second portion configured to contact a left portion of the left wheel assembly while the docking station receives the robotic lawnmower and configured to contact a right portion of the right wheel assembly while the docking station receives the robotic lawnmower. In some implementations, the second portion of the guide mechanism includes a first guide member to contact the left portion of the left wheel assembly while the docking station receives the robotic lawnmower. The first guide member can be adjacent to a left edge of the docking station. The guide mechanism can include a second guide member to contact the right portion of the right wheel assembly while the docking station receives the robotic lawnmower, the second guide member being adjacent to a right edge of the docking station. In some implementations, a minimum width between the first portion of the guide mechanism and the first guide member of the second portion of the guide mechanism is no more than 90% of a maximum horizontal dimension of the left wheel assembly. In some implementations, the first portion of the guide mechanism, the second portion of the guide mechanism, a base of the docking station, and a backstop of the docking station at least partially define a collection well for debris. In some implementations, the backstop of the docking station, the second portion of the guide mechanism, and the base of the docking station at least partially define a debris channel extending between an edge of the docking station and the collection well. In some implementations, the electrical connector of the docking station is positioned along a longitudinal axis of the docking station, and the first portion of the guide mechanism is centered along the longitudinal axis of the docking station.

In some implementations, drive wheels of the robotic lawnmower are positioned on a base of the docking station when the electrical connector of the robotic lawnmower interfaces with the electrical connector of the docking station.

In some implementations, an overall width of the docking station is between 100% and 125% of an overall width of the robotic lawnmower.

In some implementations, the electrical connector of the robotic lawnmower includes four or more independently deflectable contact arms each configured to contact the electrical connector of the docking station when the robotic lawnmower is docked with the docking station.

In some implementations, each of the four or more independently deflectable contact arms includes a cutout arranged within an outer perimeter of the deflectable contact arms.

In some implementations, the docking station includes one or more beacons, and the robotic lawnmower is configured to navigate along a mowable area while detecting the one or more beacons of the docking station.

In some implementations, the system includes the robotic lawnmower, and the robotic lawnmower includes the left wheel assembly, the right wheel assembly, and the electrical connector of the robotic lawnmower. In some implementations, the right wheel assembly and the left wheel assembly of the robotic lawnmower each includes a caster wheel.

In some implementations, docking the robotic lawnmower with the docking station further includes first navigating the robotic lawnmower toward the docking station based on detecting the radiofrequency signals emitted by the beacons. Navigating the robotic lawnmower toward the docking station based on the detected radiofrequency signal can include navigating the robotic lawnmower toward the docking station based on the detected radiofrequency signal after navigating the robotic lawnmower toward the docking station based on detecting the radiofrequency signals emitted by the beacons.

In some implementations, the robotic lawnmower includes transceivers, and determining the heading of the robotic lawnmower includes determining the heading of the robotic lawnmower based on detecting the emitted radiofrequency signal using the transceivers.

In some implementations, navigating the robotic lawnmower toward the docking station includes navigating the robotic lawnmower such that, if the robotic lawnmower is misaligned with the docking station, a left portion of a right wheel assembly of the robotic lawnmower contacts a first portion of the docking station or a right portion of a left wheel assembly of the robotic lawnmower contacts a second portion of the docking station.

In some implementations, a first subset of the beacons includes the beacon, and the beacons further includes a second subset of the beacons. The second subset of the beacons can be physically remote from the docking station.

In some implementations, navigating the robotic lawnmower toward the docking station includes rotating the robotic lawnmower based on the determined heading such that a forward drive direction of the robotic lawnmower aligns with a longitudinal axis of the robotic lawnmower docking station along which an electrical connector of the docking station is positioned.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

FIGS. 4A-4D are perspective, top, side, and front views, respectively, of an example of a docking station.

Like reference numbers and designations in the various drawings indicate like elements.

DETAILED DESCRIPTION

Autonomous robotic lawnmowers can reduce the time needed to maintain lawns by autonomously maneuvering about the lawns to mow grass on the lawns. An autonomous robotic lawnmower, for example, operates autonomously by navigating about a mowable area such as a lawn to cut grass in the mowable area or a portion of the mowable area. Between operations to mow the mowable area or during an operation to mow the mowable area, the robotic lawnmower can autonomously initiate a docking operation in which the robotic lawnmower returns to a docking station to recharge a battery of the robotic lawnmower. For example, in some implementations the robotic lawnmower can complete a mowing operation to mow the mowable area and return to the docking station during a docking operation to recharge the battery in preparation for another mowing operation. In other implementations, the robotic lawnmower can complete a portion of the mowing operation to mow the mowable area and return to the docking station during a docking operation to recharge the battery in preparation for completing another portion of the mowing operation.

Figure 1:
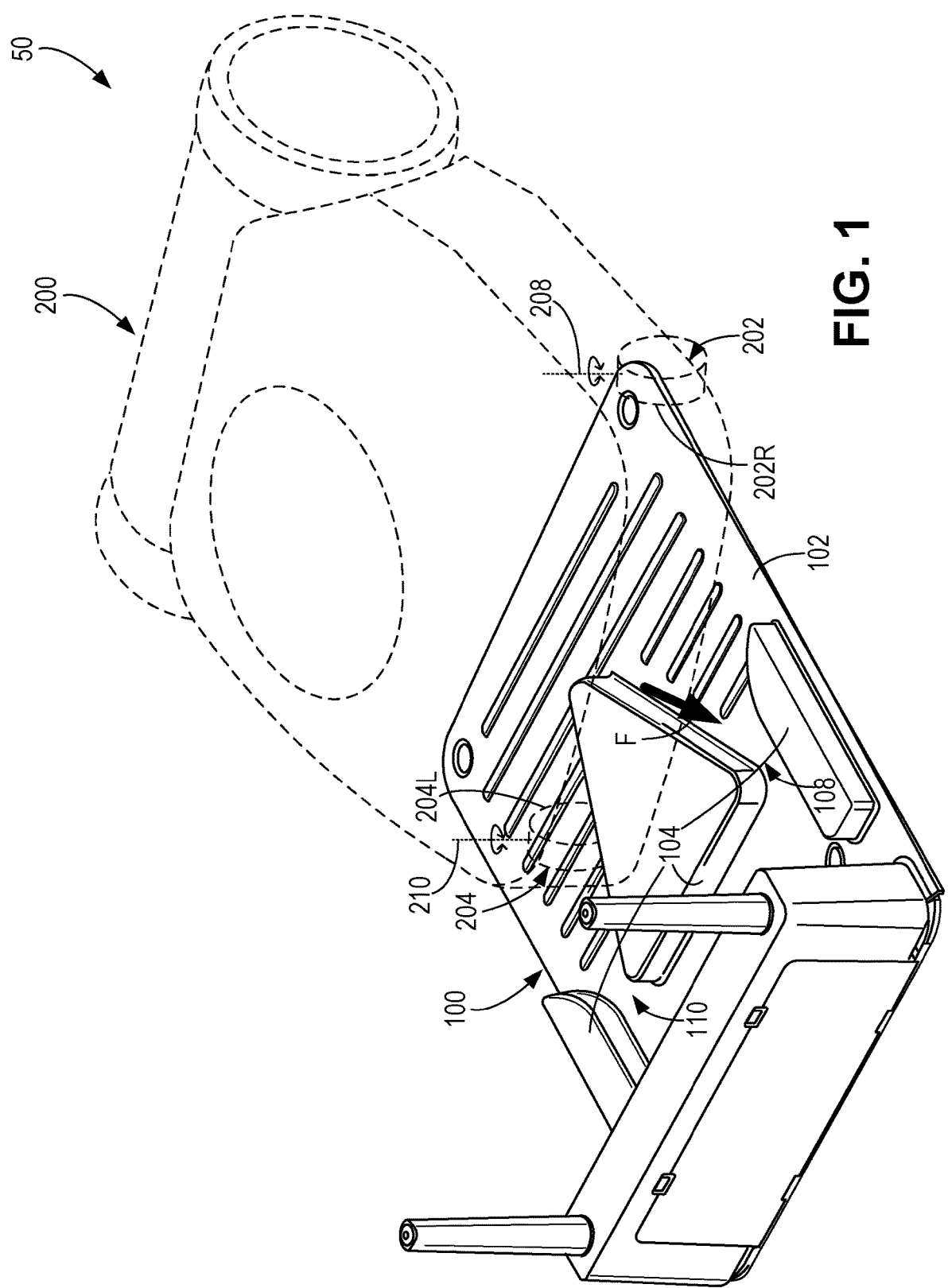
FIG. 1 is a perspective view of a robotic lawnmower system including a robotic lawnmower and a docking station.

Referring to the example shown in FIG. 1, a robotic lawnmower system 50 includes a docking station 100 and an autonomous mobile robot, e.g., autonomous robotic lawnmower 200. FIG. 1 illustrates the robotic lawnmower system 50 during a docking operation in which the robotic lawnmower 200 is navigating toward the docking station 100 to dock with the docking station 100. When the robotic lawnmower 200 is docked with the docking station 100, the robotic lawnmower 200 is electrically connected to the docking station 100 such that the docking station 100 can recharge the battery of the robotic lawnmower 200. In the example depicted in FIG. 1, the robotic lawnmower 200 moves in a forward drive direction F toward the docking station 100. To dock with the docking station 100, wheel assemblies 202, 204 of the robotic lawnmower 200 are guided along paths along a base 102 of the docking station 100. As described herein, the paths along the base 102 are defined at least in part by a guide mechanism 104 including one or more physical features that interact with the wheel assemblies 202, 204 of the robotic lawnmower 200 to guide the wheel assemblies 202, 204 along the paths.

In the example of the robotic lawnmower 200 shown in FIG. 1, the wheel assemblies 202, 204 are left and right wheel assemblies 202, 204. When directional terms "left" and "right" are used herein in reference to an element of the robotic lawnmower 200 or to an element of the docking station 100, the terms "left" and "right" refer to the "left" direction from the perspective of the robotic lawnmower 200 and the "right" direction from the perspective of the robotic lawnmower 200. When directional terms "forward," "front," "rearward," or "rear" are used herein in reference to an element of the robotic lawnmower 200 or to an element of the docking station 100, the terms "forward," "front," "rearward," or "rear" refer to directions from the perspective of the device, e.g., the robotic lawnmower 200 or the docking station 100, that includes the element.

The docking station 100 includes an electrical connector 106 (shown in FIG. 4A) configured to interface with an electrical connector 206 (shown in FIG. 3B) of the robotic lawnmower 200 so that the docking station 100 can charge a battery of the robotic lawnmower 200. The robotic lawnmower 200 moves horizontally relative to the docking station 100 to horizontally engage the electrical connector 206 with the electrical connector 106. The docking station 100 includes one or more physical features along the base 102 that form the guide mechanism 104 for guiding the wheel assemblies 202, 204 and thereby guide the robotic lawnmower 200 to a charging position in which the electrical connector 206 of the robotic lawnmower 200 interfaces with the electrical connector 106 of the docking station 100. When the robotic lawnmower 200 is in the charging position, the docking station 100 can deliver electrical energy to the battery of the robotic lawnmower 200.

In certain examples, an electrical connector of a robotic lawnmower can be misaligned with an electrical connector of a docking station as the robotic lawnmower approaches the docking station. As a result, the electrical connector of the robotic lawnmower may be unable to properly engage with the electrical connector of the docking station. In the example shown in FIG. 1, the guide mechanism 104 guides movement of the robotic lawnmower 200 along the base 102 of the docking station 100 such that the electrical connector 106 of the docking station 100 is aligned with the electrical connector 206 of the robotic lawnmower 200 while the docking station 100 receives the robotic lawnmower 200. For example, the guide mechanism 104 can align the electrical connector 206 of the robotic lawnmower 200 with the electrical connector 106 of the docking station 100 by ensuring that a longitudinal axis YR of the robotic lawnmower 200 is aligned with a longitudinal axis YD of the docking station 100, e.g., substantially collinear with the longitudinal axis YD of the docking station 100. The electrical connector 106 of the docking station 100 is positioned along which the longitudinal axis YD, and the electrical connector 206 of the robotic lawnmower 200 is positioned along the longitudinal axis YR. As a result, alignment of these longitudinal axes YR, YD can ensure that the electrical connector 206 of the robotic lawnmower 200 engages with the electrical connector 106 of the docking station 100 when the robotic lawnmower 200 moves in the forward drive direction F toward the electrical connector 106 of the docking station 100.

If the electrical connector 106 and the electrical connector 206 are misaligned, the guide mechanism 104 can guide movement of the robotic lawnmower 200 to align the electrical connector 206 of the robotic lawnmower 200 with the electrical connector 106 of the docking station 100. For example, if the electrical connector 206 is misaligned with the electrical connector 106 as shown in FIG. 1, the guide mechanism 104 can contact a left portion 204L of the right wheel assembly 204 of the robotic lawnmower 200 to guide the right wheel assembly 204 rightward to align the electrical connector 206 of the robotic lawnmower 200 with the electrical connector 106 of the docking station 100. The contact between the left portion 204L of the right wheel assembly 204 and the guide mechanism 104 causes the right wheel assembly 204 to move along the portion of the guide mechanism 104 that the right wheel assembly 204 contacts. In other examples, if the electrical connector 206 is misaligned with the electrical connector 106, the guide mechanism 104 can contact a right portion 202R of the left wheel assembly 202 of the robotic lawnmower 200 to guide the left wheel assembly 202 leftward to align the electrical connector 206 of the robotic lawnmower 200 with the electrical connector 106 of the docking station 100. The contact between the right portion 202R of the left wheel assembly 202 and the guide mechanism 104 causes the left wheel assembly 202 to move along the portion of the guide mechanism 104 that the left wheel assembly 202 contacts.

In addition to guiding movement of the robotic lawnmower 200 to align the electrical connector 106 and the electrical connector 206, the guide mechanism 104 causes the wheel assemblies 202, 204 to rotate about substantially vertical axes 208, 210 such that rolling directions of the wheel assemblies 202, 204 are aligned with the forward drive direction F when the robotic lawnmower 200 is docked with the docking station. For example, in certain examples, a wheel assembly of a robotic lawnmower can drag along a base of a docking station if the rolling direction of the wheel of the wheel assembly forms too high an angle with the forward drive direction of the robotic lawnmower 200. In particular, a wheel of the wheel assembly can drag along the base without rolling. In the example shown in FIG. 1, the guide mechanism 104 can contact the wheel assemblies 202, 204 to ensure that the wheel assemblies 202, 204 and their wheels 212, 214 (shown in FIG. 3A) are aligned with the forward drive direction F when the robotic lawnmower 200 is docked with the docking station 100. The wheels 212, 214 can be aligned with first and second channels 108, 110 along the base 102 of the docking station 100. In the example depicted in FIG. 1, if the right wheel assembly 204 is rotationally misaligned with the forward drive direction F, the guide mechanism 104 contacts the right wheel assembly 204 to rotate the right wheel assembly 204 about the substantially vertical axis 210 while the robotic lawnmower 200 moves in the forward drive direction F toward the electrical connector 106 of the docking station 100. This rotation aligns the right wheel assembly 204 with the second channel 110. In other examples, if the left wheel assembly 202 is rotationally misaligned with the forward drive direction F, the guide mechanism 104 contacts the left wheel assembly 202 to rotate the left wheel assembly 202 about the substantially vertical axis 208 while the robotic lawnmower 200 moves in the forward drive direction toward the electrical connector 106 of the docking station 100. This rotation aligns the left wheel assembly 202 with the first channel 108. With the left and right wheel assemblies 202, 204 aligned with the first and second channels 108, 110, respectively, and the forward drive direction F, the robotic lawnmower 200 can move across the base 102 without dragging the wheels 212, 214 of the wheel assemblies 202, 204, e.g., while the robotic lawnmower 200 leaves the docking station 100 to mow the mowable area 10.

Figure 2:
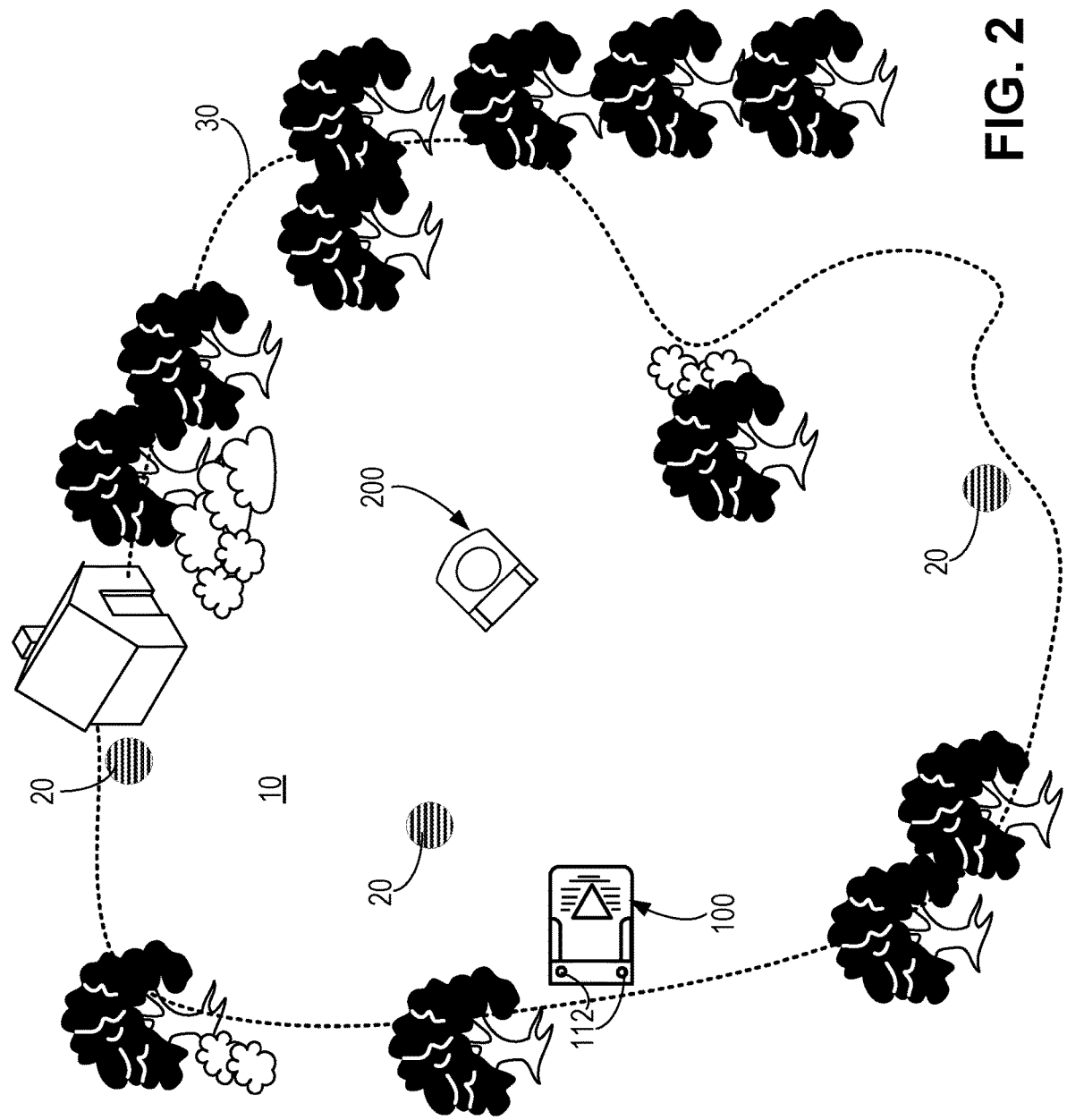
FIG. 2 is a top view of an example of a robotic lawnmower system in a mowable area.

The robotic lawnmower 200 docks at the docking station 100 to receive electrical energy that can be used to perform an autonomous mowing operation on a mowable area. Referring to FIG. 2, the robotic lawnmower 200 can mow a mowable area 10 during the mowing operation. During the mowing operation, the robotic lawnmower 200 autonomously navigates about the mowable area 10 while cutting vegetation, e.g., grass, weeds, or other vegetation, in the mowable area 10. The robotic lawnmower 200 cuts the vegetation with one or more cutting assemblies, e.g., cutting assemblies 216, 218 shown in FIG. 3A.

To navigate relative to the mowable area 10, the robotic lawnmower 200 detects beacons 20 that emit signals detectable by the robotic lawnmower 200. The mowable area 10 can be, for example, a lawn, a field, a yard, or other appropriate mowable area. The signals can be wireless signals such as, for example, radiofrequency signals (e.g., ultra-wideband signals, wideband signals, WiFi signals, or other radiofrequency signals), magnetic signals, or other appropriate wirelessly transmitted signals. The robotic lawnmower 200 can include a sensor system 220 (shown in FIG. 3B) that detects the signals emitted by the beacons 20. The sensor system 220 can include a single transceiver, or multiple transceivers. In some implementations, the sensor system 220 includes four transceivers for detecting the signals emitted by the beacons 20. The robotic lawnmower 200 can then determine a location of the robotic lawnmower 200 relative to the mowable area 10 based on the detected signals. For example, the robotic lawnmower 200 can determine a time-of-flight of each of the signals and thereby triangulate the location of the robotic lawnmower 200 relative to the beacons 20 and relative to the mowable area 10.

In further implementations, prior to navigation of the robotic lawnmower 200 about the mowable area 10, a boundary 30 of the mowable area 10 can be identified. For example, the robotic lawnmower 200 can be trained to identify the boundary 30. In some examples, in a training operation, the robotic lawnmower 200 is manually moved about the boundary 30 while the robotic lawnmower 200 detects the signals emitted by the beacons 20, e.g., using the sensor system 220. A user can manually move the robotic lawnmower 200 by pulling, pushing, or otherwise manually interacting with the robotic lawnmower 200 to move the robotic lawnmower 200 about the boundary 30. In other examples, the user can drive the robotic lawnmower 200 by interacting with a computing device configured to transmit movement commands to the robotic lawnmower 200, e.g., a personal computer, a mobile device, a remote controller, or other computing device. In examples in which the robotic lawnmower 200 identifies the boundary 30 prior to navigating about the mowable area 10 during the mowing operation, the robotic lawnmower 200 determines its location relative to the mowable area 10 during the mowing operation based on data indicative of the boundary 30 that are collected during the training operation.

The docking station 100 can include one or more beacons. In the example depicted in FIG. 2, the docking station 100 includes beacons 112 configured to emit signals detectable by the robotic lawnmower 200, e.g., using the sensor system 220. The signals emitted by the beacons 112 can be wireless signals similar to those described with respect to the beacons 20. The robotic lawnmower 200 detects the signals emitted by the beacons 112 to navigate the robotic lawnmower 200 toward the docking station 100 during a docking operation. In some implementations, the signals emitted by the beacons 112 are usable by the robotic lawnmower 200 to determine its location relative to the mowable area 10 during the mowable operation and to identify the boundary 30 of the mowable area 10 during the training operation. In other implementations, the robotic lawnmower 200 only uses the signals emitted by the beacons 20 for determining its location relative to the mowable area 10 during the mowable operation and to identify the boundary 30 of the mowable area 10 during the training operation.

Figure 3A:
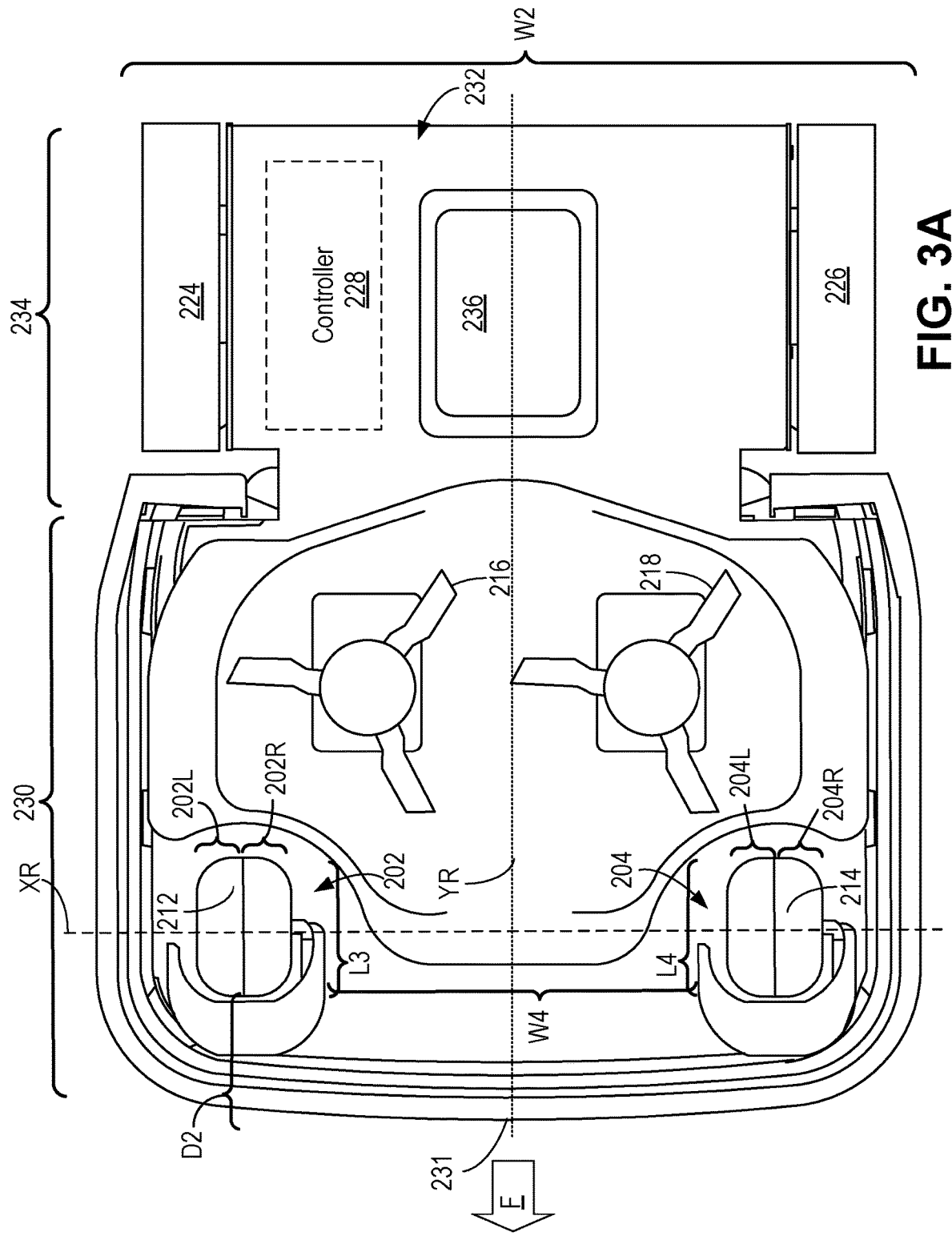
FIGS. 3A-3B are bottom and front views, respectively, of an example of a robotic lawnmower.
Figure 3B:
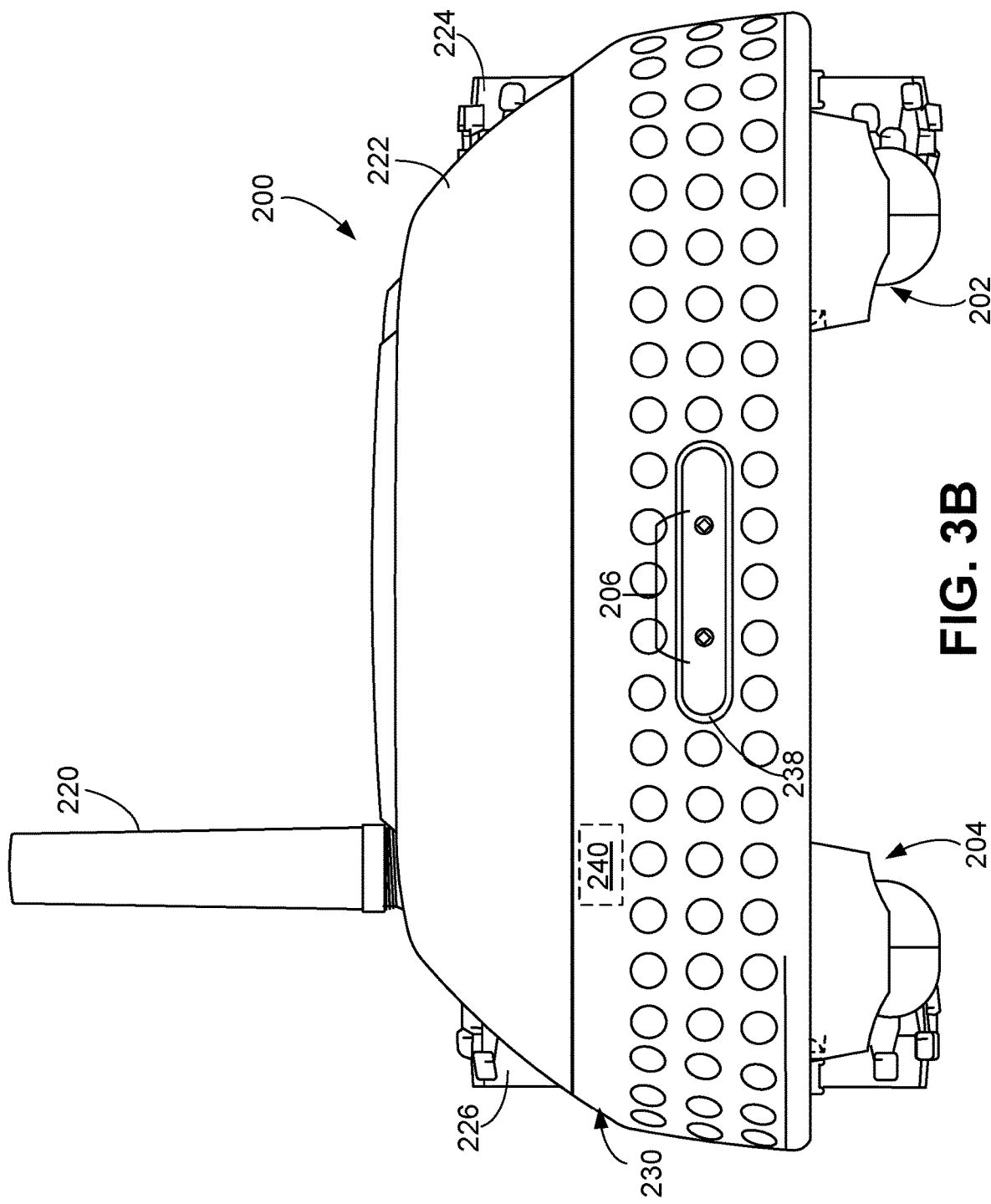

FIGS. 3A and 3B illustrate an example of the robotic lawnmower 200. The robotic lawnmower 200 includes a body 222 that can include one or more interconnected structural assemblies, e.g., one or more of a bumper, a chassis, a cutting deck, or other structural assembly.

The wheel assemblies 202, 204 are located along a bottom portion 232 of the robotic lawnmower 200, e.g., along a bottom portion of the body 222. In the example depicted in FIGS. 3A and 3B, the wheel assemblies 202, 204 are caster wheel assemblies positioned along a forward portion 230 of the robotic lawnmower 200, e.g., along a forward portion of the body 222 of the robotic lawnmower 200. The wheels 212, 214 are not actively driven.

In addition to including the wheel assemblies 202, 204, the robotic lawnmower 200 can include one or more drive wheels. For example, as shown in FIG. 3A, the robotic lawnmower 200 can include a left drive wheel 224 and a right drive wheel 226. The drive wheels 224, 226 are driven by one or more actuators, e.g., motors. The drive wheels 224, 226, as shown in the example of FIG. 3A, are positioned along a rearward portion 234 of the robotic lawnmower 200, e.g., along a rearward portion of the body 222. For example, the drive wheels 224, 226 are mounted to the rearward portion of the body 222. The drive wheels 224, 226 are positioned proximate to rearward corner portions of the robotic lawnmower 200, and the wheel assemblies 202, 204 are positioned proximate to forward corner portions of the robotic lawnmower 200.

As described herein, the robotic lawnmower 200 includes one or more cutting assemblies operable to mow vegetation on a mowable area. In the example shown in FIG. 3A, the robotic lawnmower includes the cutting assemblies 216, 218. The cutting assemblies 216, 218 include blades and are rotatable such that the blades can cut the vegetation on the mowable area. In some implementations, a height of the cutting assemblies 216, 218 can be adjustable. The cutting assemblies 216, 218 can be vertically movable away from the mowable area 10. For example, the cutting assemblies 216, 218 can be mounted to a cutting deck of the body 222, and the cutting deck can be movable vertically relative to a remainder of the body 222 such that the cutting deck with the cutting assemblies 216, 218 can be moved away from the mowable area 10.

A controller 228 of the robotic lawnmower 200 operates the one or more actuators to control the drive wheels 224, 226 and thereby navigate the robotic lawnmower 200 about a mowable area, e.g., the mowable area 10 shown in FIG. 2. The controller 228 can also communicate with the sensor system 220 to determine the location of the robotic lawnmower 200 relative to the mowable area 10 and thereby navigate the robotic lawnmower during the mowing operation or to navigate the robotic lawnmower during the docking operation. The controller 228 can store data collected during the training operation in a memory storage element in communication with the controller 228.

The robotic lawnmower 200 further includes a battery 236 to store energy usable to allow the robotic lawnmower 200 to navigate about the mowable area 10 while being untethered from an energy source, e.g., untethered from a generator, power grid, or other stationary energy source. The battery 236 is mounted to the bottom portion of the robotic lawnmower 200.

As described herein, the battery 236 receives energy from a docking station during a recharging operation, e.g., while the robotic lawnmower 200 is docked with the docking station 100, through the electrical connector 206. Referring to FIG. 3B, the electrical connector 206 is positioned on the forward portion 230 of the robotic lawnmower 200. For example, the electrical connector 206 can be positioned along a forward side portion of the robotic lawnmower 200. The electrical connector 206 is positioned along the longitudinal axis YR (shown in FIG. 3A) and extends outwardly and forwardly from the body 222 of the robotic lawnmower 200. The longitudinal axis YR can be, for example, a central axis of the robotic lawnmower 200 that is aligned with the forward drive direction F of the robotic lawnmower 200. The electrical connector 206 can extend outwardly through an opening 238 along the body 222 of the robotic lawnmower 200.

Figure 4B:
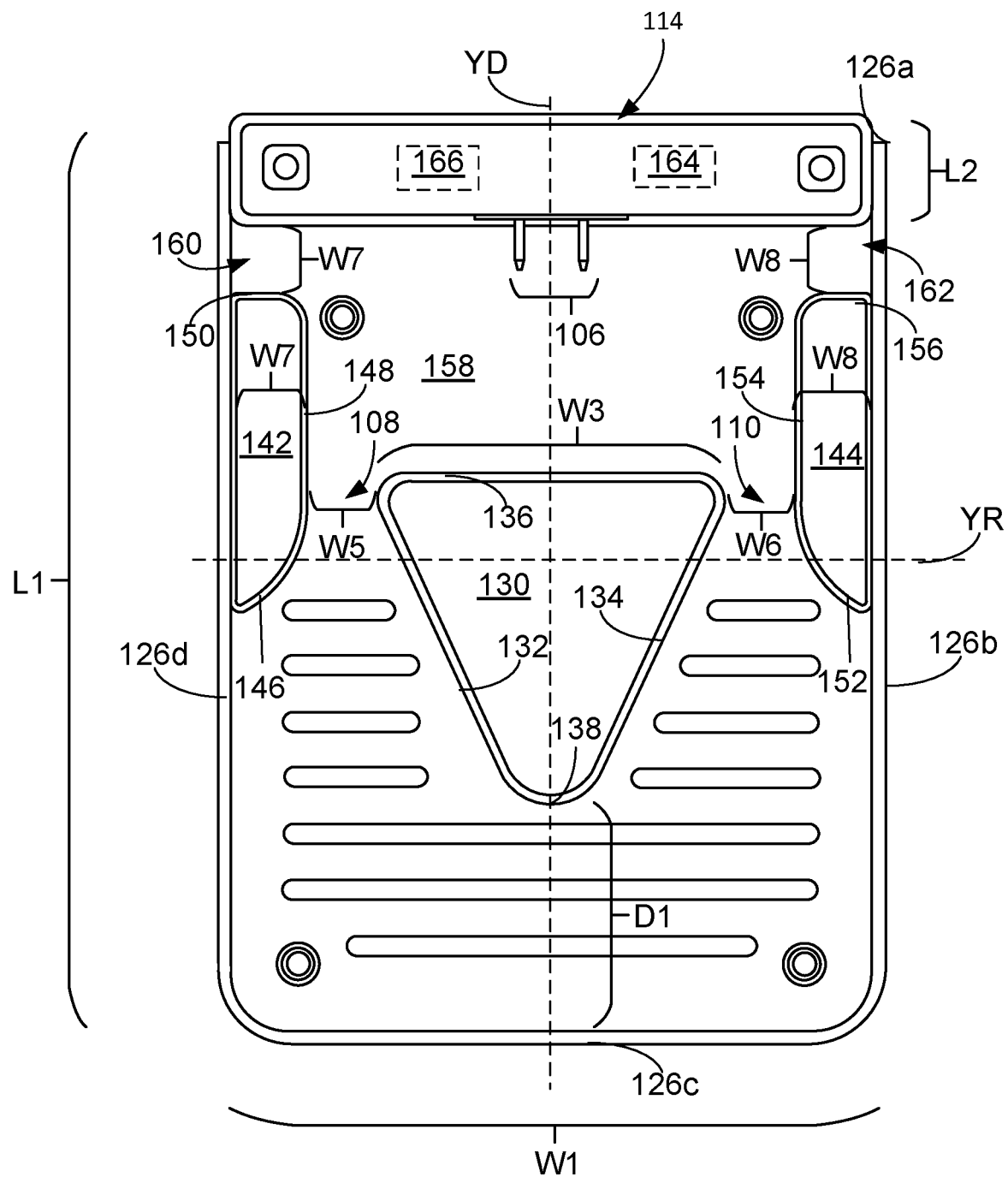
Figure 4D:
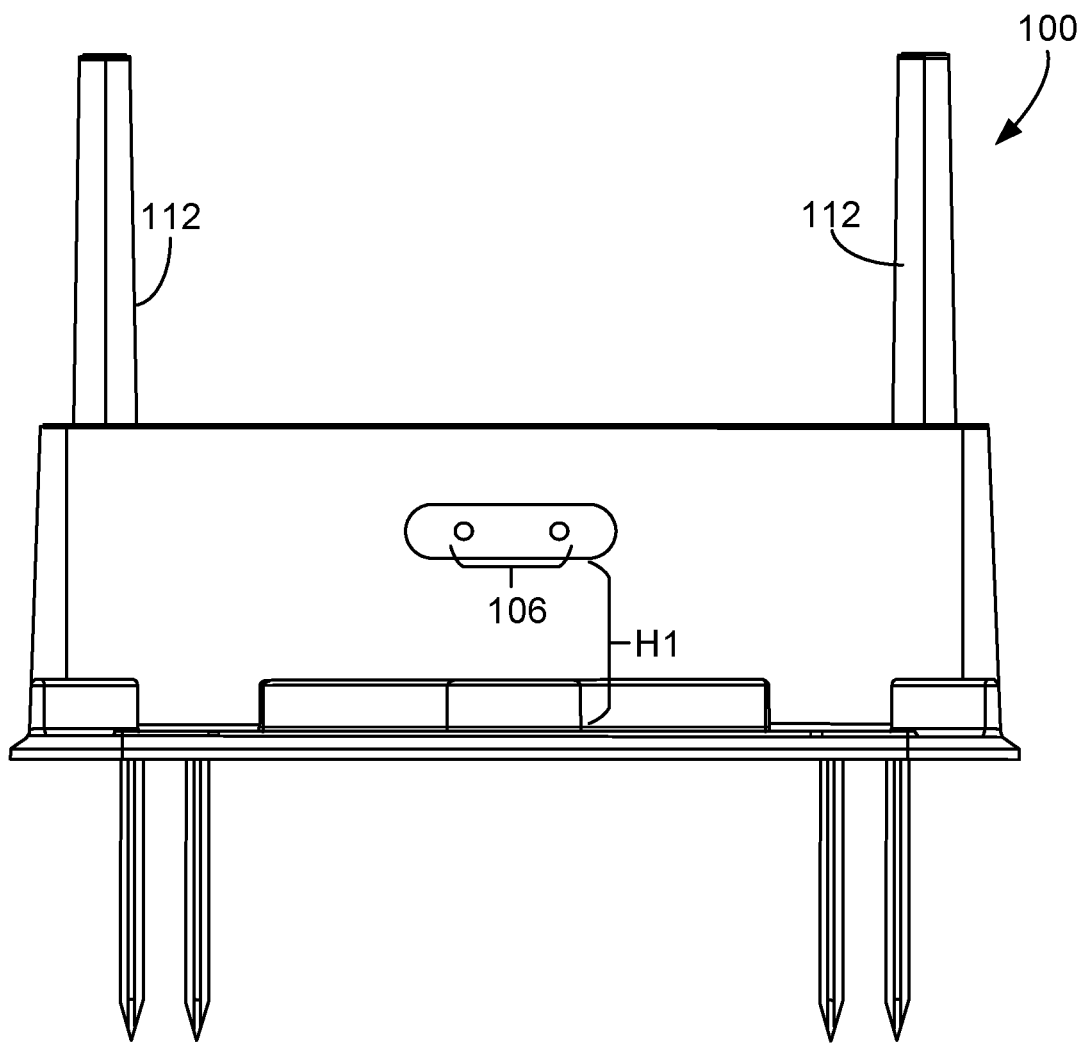

FIGS. 4A-4D illustrate an example of the docking station 100. Referring to FIG. 4A, the docking station 100 includes the base 102 and the guide mechanism 104. The base 102 is a lower portion of the docking station 100 that is configured to support wheels of the robotic lawnmower 200, e.g., the left and right wheels 212, 214 and the drive wheels 224, 226, above a mowable area as the robotic lawnmower 200 moves over the base 102. The base 102 has a substantially rectangular prismatic shape. In some implementations, the docking station 100 has a substantially rectangular footprint having a substantially rectangular perimeter. An overall width W1 of the docking station 100 is between 100% and 125% of an overall width W2 (shown in FIG. 3A) of the robotic lawnmower 200, e.g., between 100% and 105%, between 100% and 110%, or between 100% and 115% of the overall width W2 of the robotic lawnmower 200. In some implementations, the overall width W1 of the docking station 100 is between 35 and 80 centimeters, e.g., between 35 and 60 centimeters, between 40 and 65 centimeters, between 45 and 70 centimeters, between 50 and 75 centimeters, or between 55 and 80 centimeters. An overall length L1 of the docking station 100 is between 35 and 100 centimeters, e.g., between 35 and 80 centimeters, 45 and 90 centimeters, or 55 and 100 centimeters.

The docking station 100 can include a backstop 114 positioned on a rearward portion 120 of the docking station 100, e.g., positioned on a rearward portion of the base 102 of the docking station 100. The backstop 114 extends vertically from the base 102. The backstop 114 can have a width that extending across an entirety of the overall width W1 of the docking station 100. In some implementations, a length L2 of the backstop 114 is 5% to 20% of the overall length L1 of the docking station 100, e.g., between 5% and 15% of the overall length L1 of the docking station 100, between 10% and 20% of the overall length L1 of the docking station 100. The length L2 of the backstop 114 can be between 5 and 15 centimeters, e.g., between 5 and 10 centimeters, or between 10 and 15 centimeters.

In some implementations, the electrical connector 106 of the docking station 100 is positioned on the rearward portion 120 of the docking station 100. The electrical connector 106 is positioned along the longitudinal axis YD. The longitudinal axis YD can be, for example, a central axis of the docking station 100. The electrical connector 106 can include multiple electrical terminals positioned on the rearward portion 120 of the docking station 100, e.g., a negative electrical terminal and a positive electrical terminal as shown in FIG. 3A. In the example shown in FIG. 3A, a distance between the electrical terminals can be between 3 and 15 centimeters, e.g., between 3 and 6 centimeters, between 3 and 9 centimeters, or between 3 and 12 centimeters. The multiple electrical terminals can be each configured to interface with a corresponding electrical terminal on the robotic lawnmower 200.

The electrical connector 106 can be positioned above the base 102. For example, the electrical connector 106 can be positioned along the backstop 114, e.g., along a front facing surface 116 of the backstop 114. A height H1 (shown in FIG. 4D) of the electrical connector 106 above the base 102 can be, for example, 5 to 15 centimeters. The backstop 114 includes an opening 118 along the front facing surface 116. The front facing surface 116 extends along a vertically extending plane. For example, the plane along which the front facing surface 116 extends is perpendicular to a plane along which the top surface 122 of the base 102 extends. The electrical connector 106 extends through the opening 118 and outwardly and forwardly from the backstop 114. In some implementations, the backstop 114 serves as a housing for at least partially containing electrical components of the docking station 100, e.g., a power supply, a controller, or other electrical components.

The docking station 100 can be supportable on a surface of a mowable area, e.g., the mowable area 10. As shown in FIG. 4A, the docking station 100 can include one or more support members that support the docking station 100 on the mowable area. The docking station 100 can include support members 124a-124d (collectively referred to as support members 124) extending downwardly from the base 102. The support members 124 are elongate members insertable into a ground of the mowable area, e.g., a dirt ground or other soft ground of the mowable area into which the support member 124 can be inserted. The support members 124 can be, for example, stakes that can be driven into the ground of the mowable area 10, thereby supporting the docking station 100 on the mowable area 10 and preventing the docking station 100 from moving relative to the mowable area 10.

The support members 124 can be positioned proximate edges 126a-126d of the docking station 100. For example, the support members 124 can be positioned near corner portions of the docking station 100. In the example shown in FIG. 4A, the support member 124a is positioned along a rear-left portion of the docking station 100, e.g., proximate the rear edge 126a and the left edge 126d. The support member 124b is positioned along a rear-right portion of the docking station 100, e.g., proximate the rear edge 126a and the right edge 126b. The support member 124c is positioned along a front-right portion of the docking station 100, e.g., proximate the front edge 126c and the right edge 126b of the docking station 100. The support member 124d is positioned along a front-left portion of the docking station 100, e.g., proximate the front edge 126c and the left edge 126d of the docking station 100. If the docking station 100 has a substantially rectangular footprint, the rear-left, rear-right, front-right, and front-left portions correspond to quadrants of the substantially rectangular footprint, and the support members 124 are positioned proximate to rear-left, rear-right, front-right, and front-left corners of the substantially rectangular footprint. A minimum distance between each of the support members 124 and a corresponding closest one of the edges 126 can be between 3 and 20 centimeters, e.g., between 3 and 10 centimeters, between 5 and 15 centimeters, or between 10 and 20 centimeters.

As described herein, the guide mechanism 104 of the docking station 100 guides movement of the right and left wheel assemblies 202, 204 (shown in FIG. 3A) of the robotic lawnmower 200 and thereby also guides movement of the robotic lawnmower 200. This guidance can align the electrical connector 206 of the robotic lawnmower 200 with the electrical connector 106 of the docking station 100. Referring to FIG. 4B, the guide mechanism 104 includes a first portion configured to contact the right portion 202R of the left wheel assembly 202, e.g., to contact a right portion of the left wheel 212, while the docking station 100 receives the robotic lawnmower 200. This first portion can also be configured to contact the left portion 204L of the right wheel assembly 204R, e.g., to contact left portion of the right wheel 214, while the docking station 100 receives the robotic lawnmower 200. In the example depicted in FIG. 4A, this first portion corresponds to a central guide member 130 of the guide mechanism 104. The guide mechanism 104 further includes a second portion configured to contact a left portion 202L of the left wheel assembly 202 while the docking station 100 receives the robotic lawnmower 200. This second portion can also be configured to contact a right portion 204R of the right wheel assembly 204. In the example depicted in FIG. 4B, this second portion corresponds to lateral guide members 142, 144 of the guide mechanism 104.

The first and second portions of the guide mechanism 104 are positioned on the base 102 and are raised relative to the base 102. For example, as shown in FIG. 4C, a height H2 of the first and second portions of the guide mechanism 104 relative to the base 102 is at least 2 centimeters, e.g., at least 3 centimeters, at least 4 centimeters, or more.

Referring back to FIG. 4B, the central guide member 130 can be positioned along the longitudinal axis YD and can extend along the longitudinal axis YD. In some implementations, the central guide member 130 is substantially symmetric about the longitudinal axis YD.

The central guide member 130 includes a substantially triangular prismatic portion that is configured to contact the left and right wheel assemblies 202, 204. For example, the central guide member 130 can have a substantially triangular prismatic shape. The substantially triangular prismatic portion of the central guide member 130 is configured to contact the right portion 202R of the left wheel assembly 202 and is further configured to contact the left portion 204L of the right wheel assembly 204.

The central guide member 130 includes a left lateral surface 132 and a right lateral surface 134. The left lateral surface 132 and the right lateral surface 134 are nonparallel to one another and nonparallel to the longitudinal axis YD of the docking station 100. For example, the left lateral surface 132 and the right lateral surface 134 form angles with the longitudinal axis YD of the docking station between 15 and 45 degrees.

The left lateral surface 132 is a substantially planar surface defining a path along which the left wheel assembly 202 can travel during the docking operation. The left lateral surface 132 is configured to contact the right portion 202R of the left wheel assembly 202 when the robotic lawnmower 200 is moving along the base 102 of the docking station and the longitudinal axis YR of the robotic lawnmower 200 is positioned rightward of the longitudinal axis YD of the docking station 100, e.g., the electrical connector 206 of the robotic lawnmower 200 is positioned rightward of the electrical connector 106 of the docking station 100. The left lateral surface 132 is slanted relative to the longitudinal axis YD and thus guides the left wheel assembly 202 along a path along the base 102 that is slanted relative to the longitudinal axis YD toward the left edge 126d. The left lateral surface 132 extends rearward away from the longitudinal axis YD and toward the electrical connector 106 from a first end portion 134a to a second end portion 134b of the left lateral surface 132. The first end portion 134a is a front end portion of the left lateral surface 132 and is positioned proximate the longitudinal axis YD, and the second end portion 134b is a rear end portion of the left lateral surface 132 and is positioned proximate the left lateral guide member 142.

The right lateral surface 134 has features similar to those described with respect to the left lateral surface 132. For example, the right lateral surface 134 can be symmetric to the left lateral surface 132 about the longitudinal axis YD. In this regard, the right lateral surface 134 can be a substantially planar surface defining a path along which the right wheel assembly 204 can travel during the docking operation. The right lateral surface 134 is configured to contact the left portion 204L of the right wheel assembly 204 when the robotic lawnmower 200 is moving along the base 102 of the docking station and when the longitudinal axis YR of the robotic lawnmower 200 is positioned leftward of the longitudinal axis YD of the docking station 100, e.g., the electrical connector 206 of the robotic lawnmower 200 is positioned leftward of the electrical connector 106. The right lateral surface 134 is slanted relative to the longitudinal axis YD and thus guides the right wheel assembly 202 along a path along the base 102 that is slanted relative to the longitudinal axis YD toward the right edge 126b. The right lateral surface 134 extends rearward away from the longitudinal axis YD and toward the electrical connector 106 from a first end portion 132a to a second end portion 132b of the right lateral surface 134. The first end portion 132a is a front end portion of the right lateral surface 134 and is positioned proximate the longitudinal axis YD, and the second end portion 132b is a rear end portion of the right lateral surface 134 and is positioned proximate the right lateral guide member 144.

The central guide member 130 can further include a rearward portion that can ensure that a transverse axis XR (shown in FIG. 3A) extending through the wheel assemblies 202, 204 are aligned with a transverse axis XD of the docking station 100, e.g., parallel to the transverse axis XD of the docking station 100. The rearward portion of the central guide member 130 can include a maximum width W3 no more than a minimum width W4 (shown in FIG. 3A) between the wheel assemblies 202, 204. The width W3 can correspond to a width between the right lateral surface 134 of the central guide member 130 and the left lateral surface 132 of the central guide member 130. In some implementations, the maximum width W3 is no more than 100%, no more than 90%, or no more than 80% of the minimum width W4 between the wheel assemblies 202, 204. In some examples, the maximum width W3 is between 90% and 100% of the minimum width W4 between the wheel assemblies 202, 204. The maximum width W3 can be between 15 cm and 45 cm, e.g., 15 cm to 30 cm, 20 cm to 35 cm, 25 cm to 40 cm, 30 cm to 45 cm, 20 cm to 40 cm, 25 cm to 35 cm. The width W3 can be, for example, between 40% and 60% of the overall width W1 of the docking station 100, e.g., 40% to 50%, 45% to 55%, or 50% to 60% of the overall width W1 of the docking station 100.

The rearward portion of the central guide member 130 can include, for example, a rearward surface 136 extending from proximate the second end portion 134b of the right lateral surface 134 to proximate the second end portion 132b of the left lateral portion 132. The rearward surface 136 defines a plane substantially perpendicular to the longitudinal axis YD of the docking station 100.

In certain examples, raised portions of a base of a docking station can contact a bottom portion of a robotic lawnmower as the robotic lawnmower moves across the base, thereby impeding movement of the robotic lawnmower relative to the docking station. In the example shown in FIG. 4B, the central guide member 130 can be positioned to prevent such contact from occurring. For example, a forwardmost portion 138 of the guide mechanism 104 can be positioned a sufficient distance D1 from a forwardmost portion of the base 102, e.g., from the front edge 126c of the base 102. The distance D1 between the forwardmost portion 138 of the guide mechanism 104 and the front edge 126c of the base 102 can be between 100% to 150% of a longitudinal distance D2 between a forwardmost portion 231 (shown in FIG. 3A) of the robotic lawnmower 200 and a rearwardmost portion of the wheel assemblies 202, 204. The distance D1 can be 20% to 40% of an overall length L1 of the docking station.

The distance D1 can be, for example, 10 to 30 centimeters, e.g., 10 to 20 centimeters, 15 to 25 centimeters, or 20 to 30 centimeters. This distance can ensure that the wheel assemblies 202, 204 are positioned on the base 102 before the forwardmost portion 231 of the robotic lawnmower 200 overlaps with the central guide member 130, thereby allowing the body 222 of the robotic lawnmower 200 to clear the central guide member 130.

As described herein, the first portion of the guide mechanism 104 includes the central guide member 130, and the second portion of the guide mechanism 104 includes the lateral guide members 142, 144. The lateral guide members 142, 144 at least partially define the left and right channels 108, 110 above the base 102 for the wheel assemblies 202, 204. In some implementations, the lateral guide members 142, 144 are symmetric to one another about the longitudinal axis YD of the docking station 100.

The left channel 108 is at least partially defined by the left lateral guide member 142, the base 102, and the left lateral surface 132 of the central guide member 130. The right channel 110 is at least partially defined by the right lateral guide member 144, the base 102, and the right lateral surface 134 of the central guide member 130. The left and right channels 108, 110 are configured to receive the left and right wheel assemblies 202, 204 in specific orientations. In particular, the left and right channels 108, 110 can align an orientation of the left wheel assembly 202 about the left substantially vertical axis 208, an orientation of the right wheel assembly 204 about the right substantially vertical axis 210, and an orientation of the transverse axis XR extending through the left and right wheel assemblies 202, 204 to specific orientations that enable the robotic lawnmower 200 to properly dock with and undock from the docking station 100. For example, the lateral guide members 142, 144 and the central guide member 130 can cooperate to rotate the left and right wheel assemblies 202, 204 about the vertical axes and orient the left and right wheel assemblies 202, 204 about the vertical axes 208, 210 such that their rolling directions are aligned with the forward drive direction F of the robotic lawnmower 200. The lateral guide members 142, 144 and the central guide member 130 also cooperate to rotate the robotic lawnmower 200 in such a way that the transverse axis XR is substantially perpendicular to the longitudinal axis YD of the docking station 100, e.g., substantially parallel to a transverse axis of the docking station 100.

The left lateral guide member 142 is adjacent to the left edge 126d of the docking station 100 and positioned leftward of the central guide member 130. The left lateral guide member 142 includes a front curved surface 146 extending laterally toward the longitudinal axis YD away from the right edge 126d of the base 102. The left lateral guide member 142 in some implementations further includes a lateral planar surface 148 extending rearward from the front curved surface 146 toward the electrical connector 106. The front curved surface 146 and the lateral planar surface 148 extend vertically away from the base 102. Accordingly, the front curved surface 146 and the lateral planar surface 148 are configured to contact a left portion 202L of the left wheel assembly 202 to guide the left wheel assembly 202 rightward toward the left channel 108. In some implementations, the left lateral guide member 142 further includes a rearward facing planar surface 150 extending laterally from proximate the left edge 126d of the base 102 toward the longitudinal axis YD of the docking station 100.

The right lateral guide member 144 is adjacent to the right edge 126b of the docking station 100 and positioned rightward of the central guide member 130. The right lateral guide member 144 includes a front curved surface 152 extending laterally toward the longitudinal axis YD away from the right edge 126d of the base 102. The right lateral guide member 144 in some implementations further includes a lateral planar surface 154 extending rearward from the front curved surface 152 toward the electrical connector 106. The front curved surface 152 and the lateral planar surface 154 extend vertically away from the base 102. Accordingly, the front curved surface 152 and the lateral planar surface 154 are configured to contact a right portion 204R of the right wheel assembly 204 to guide the right wheel assembly 204 rightward toward the right channel 110. In some implementations, the right lateral guide member 142 further includes a rearward facing planar surface 156 extending laterally from proximate the right edge 126b of the base 102 toward the longitudinal axis YD of the docking station 100.

Minimum widths W5, W6 of the channels 108, 110 can be sized based on a maximum horizontal dimension of the wheels 212, 214, e.g., lengths L3, L4 (shown in FIG. 3A) of the wheels 212, 214. The minimum widths W5, W6 can be sized such that the wheels 212, 214 of the wheel assemblies 202, 204 can only move through the channels 108, 110 if the wheels 212, 214 are oriented with the rolling directions substantially parallel to the forward drive direction F of the robotic lawnmower 200. The minimum widths W5, W6 of the channels 108, 110 can be, for example, no more than 95%, e.g., no more than 90%, no more than 85%, no more than 80%, of the maximum horizontal dimension of the wheels 212, 214. The maximum widths W5, W6 can be, for example, between 4 and 8 centimeters, e.g., between 4 and 6 centimeters, between 5 and 7 centimeters, or between 6 and 8 centimeters. Maximum widths W7, W8 of the lateral guide members 142, 144 can be small to reduce the overall width W1 of the docking station 100. For example, the maximum widths W7, W8 of the lateral guide member 142, 144 can each be between 5% and 15% of the overall width W1 of the docking station 100, e.g., 5% to 10%, 7.5% to 12.5%, or 10% to 15% of the overall width W1 of the docking station 100. The maximum widths W7, W8 can be between, for example, 4 and 8 centimeters, e.g., between 4 and 6 centimeters, between 5 and 7 centimeters, or between 6 and 8 centimeters.

The docking station 100 can further include one or more debris collection features that collect debris from the robotic lawnmower 200. The robotic lawnmower 200 can collect debris on an exterior of the robotic lawnmower 200, e.g., on the wheel assemblies 202, 204, on the cutting assemblies 216, 218, on an exterior of the body 222, or on other components exposed to an environment of the robotic lawnmower 200, as the robotic lawnmower 200 mows vegetation on the mowable area 10. This debris can include cut vegetation, dirt, or other potential debris on the mowable area 10. Debris collected on the exterior of the robotic lawnmower 200 can fall off of the robotic lawnmower 200 while the robotic lawnmower 200 is docked with the docking station 100. The one or more debris collection features can provide space for this debris such that the debris is less likely to impede movement of the robotic lawnmower 200.

In the example depicted in FIG. 4B, the docking station 100 includes a central collection well 158 for debris. The collection well 158 can be a space having a substantially rectangular perimeter that is at least partially surrounded by portions of the docking station 100 that are raised relative to the base 102. The collection well 158 is positioned along the rearward portion 120 of the docking station 100. The raised portions of the docking station 100 that at least partially define the collection well 158 can include the first and second portions of the guide mechanism 104, the base 102, and the backstop 114 of the docking station 100. The collection well 158 is rearward of the channels 108, 110 and is directly connected to the channels 108, 110.

The docking station 100 can further include one or more debris channels that provide space for debris to be manually moved away from the docking station 100. In the example depicted in FIG. 4B, the docking station 100 includes a left debris channel 160 and a right debris channel 162 along the rearward portion 120 of the docking station 100. The debris channels 160, 162 are directly connected to the collection well 158. The left debris channel 160 extends laterally from the collection well 158 to the left edge 126d of the base 102. The left debris channel 160 is at least partially defined by the base 102, the left lateral guide member 142, and the backstop 114 of the docking station 100. The right debris channel 162 extends laterally from the collection well 158 to the right edge 126b of the base 102. The right debris channel 162 is at least partially defined by the base 102, the right lateral guide member 144, and the backstop 114 of the docking station 100. The debris channels 160, 162 can each have a width W9, W10 between In some implementations, the docking station 100 includes a sensor for detecting that the robotic lawnmower 200 is proximate to or docked with the docking station 100. For example, the docking station 100 can include a Hall Effect sensor 164. The Hall Effect sensor 164 can be housed in the backstop 114 of the docking station 100. The Hall Effect sensor 164 can detect a magnet 240 (shown in FIG. 3B) housed on the robotic lawnmower 200. When the Hall Effect sensor 164 detects the magnet 240, the docking station 100 can initiate energy delivery to the robotic lawnmower 200. In particular, a controller 166 of the docking station 100 can activate an energy delivery system to deliver energy to the battery 236 of the robotic lawnmower 200 by transmitting the energy through the electrical circuit formed when the electrical connectors 106, 206 are engaged with one another. By only transmitting energy to the electrical connectors 106 if the robotic lawnmower 200 is proximate to or docked with the docking station 100, electrical arcing is less likely to occur between contacts of the electrical connector 106.

In implementations in which the docking station 100 includes the beacons 112, the beacons 112 can be positioned along the backstop 114. For example, referring to FIG. 4D, the beacons 112 can be positioned on top of the backstop 114. The beacons 112 can extend upwardly from the backstop 114 such that obstacles in the environment are less likely to interfere with signals emitted by the beacons 112.

Figure 5A:
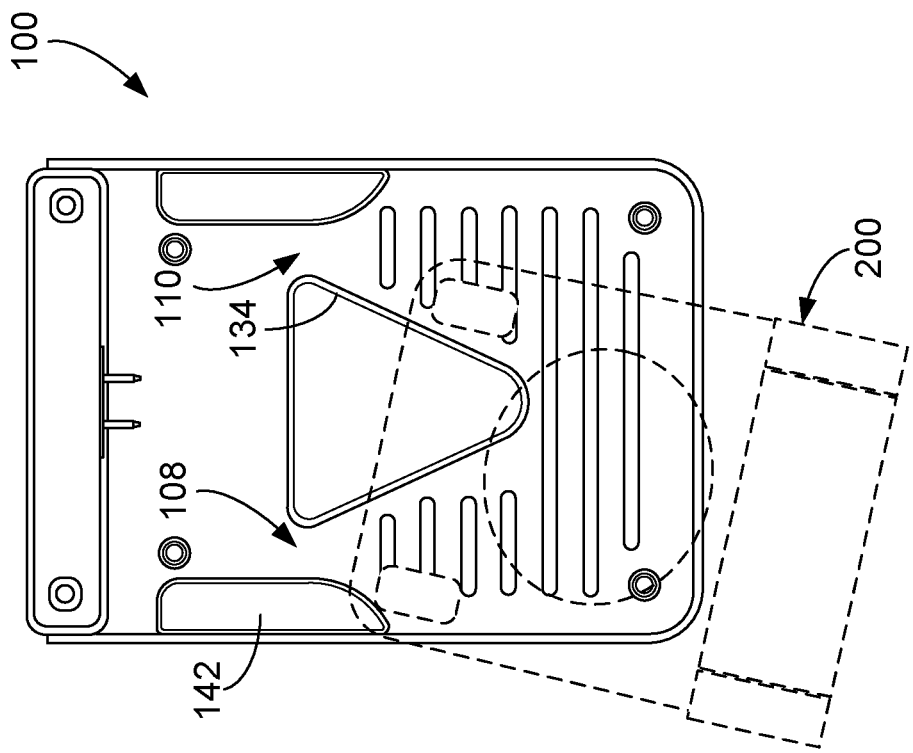
FIGS. 5A-5H illustrate various examples of a docking station and a robotic lawnmower of a robotic lawnmower system during a docking operation.
Figure 5B:
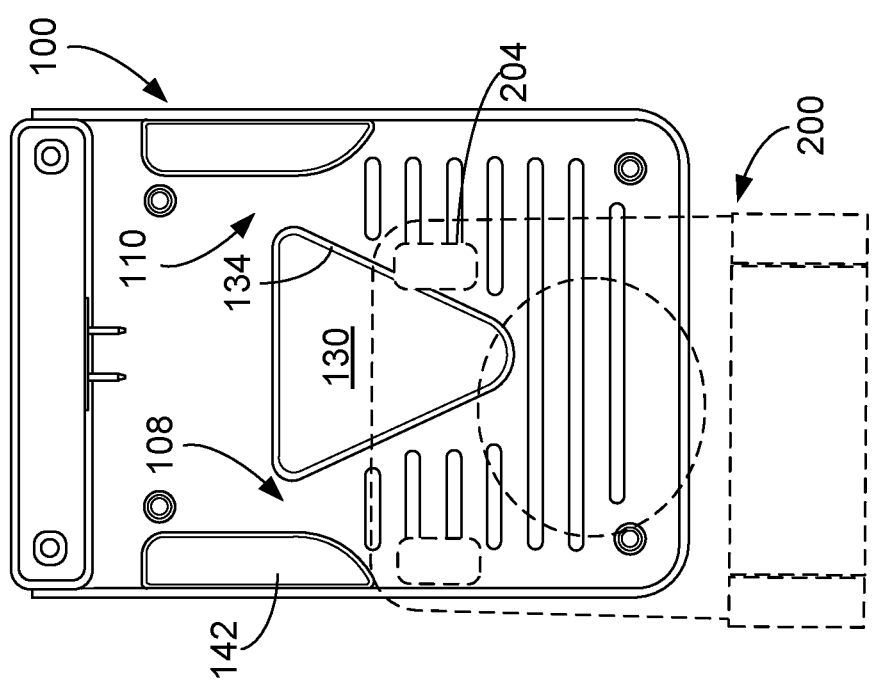
Figure 5C:
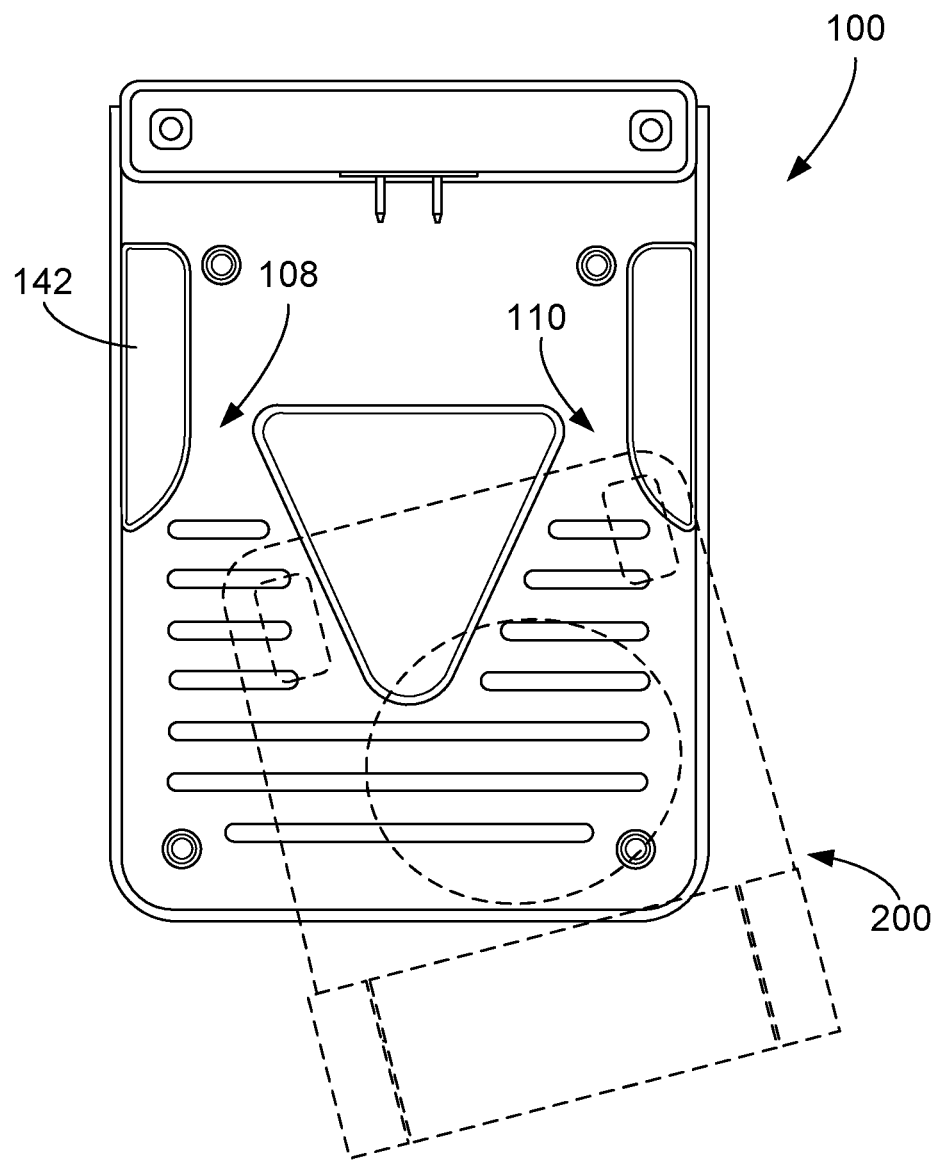

FIGS. 5A-5G illustrate different examples of the robotic lawnmower system 50 with the robotic lawnmower 200 moving toward the docking station 100 from different approaches. FIGS. 5A-5C illustrate the robotic lawnmower 200 approaching the docking station 100 in such a manner that the right wheel assembly 204 contacts the central guide member 130. In FIG. 5A, the longitudinal axis YR (shown in FIG. 3A) of the robotic lawnmower 200 is parallel to the longitudinal axis YD (shown in FIG. 4A) but is offset to the left of the longitudinal axis YD of the docking station 100. In FIG. 5B, the robotic lawnmower 200 approaches the docking station 100 from the left of the docking station 100. The longitudinal axis YR of the robotic lawnmower 200 and the right lateral surface 134 of the central guide member 130 are both tilted relative to the longitudinal axis YD of the docking station 100 toward the right. The longitudinal axis YR of the robotic lawnmower 200 forms an angle with the longitudinal axis YD of the docking station 100 that is less than the angle between the right lateral surface 134 of the central guide member 130 and the longitudinal axis YD of the docking station 100. In some implementations, in addition to contacting the right lateral surface 134 with the right wheel assembly 204, the robotic lawnmower 200 contacts the left lateral guide member 142 with the left wheel assembly 202. In FIG. 5C, the robotic lawnmower 200 approaches the docking station 100 from the right of the docking station 100. The longitudinal axis YR of the robotic lawnmower 200 intersects with the right lateral surface 134.

In each of the examples illustrated in FIGS. 5A-5C, the right wheel assembly 204 is not aligned with the second channel 110 as the robotic lawnmower 200 approaches the docking station but before the right wheel assembly 204 contacts the right lateral surface 134 of the central guide member. The robotic lawnmower 200 moves in the forward drive direction F in such a manner that the right wheel assembly 204 contacts the right lateral surface 134 of the central guide member 130. The right wheel assembly 204, by contacting the right lateral surface 134, is guided toward the second channel 110 along a path on the base 102 adjacent the right lateral surface 134. In addition, during this process, the left wheel assembly 202 may also contact the left lateral guide member 142 to further guide the left wheel assembly 202 toward the first channel 108.

Figure 5E:
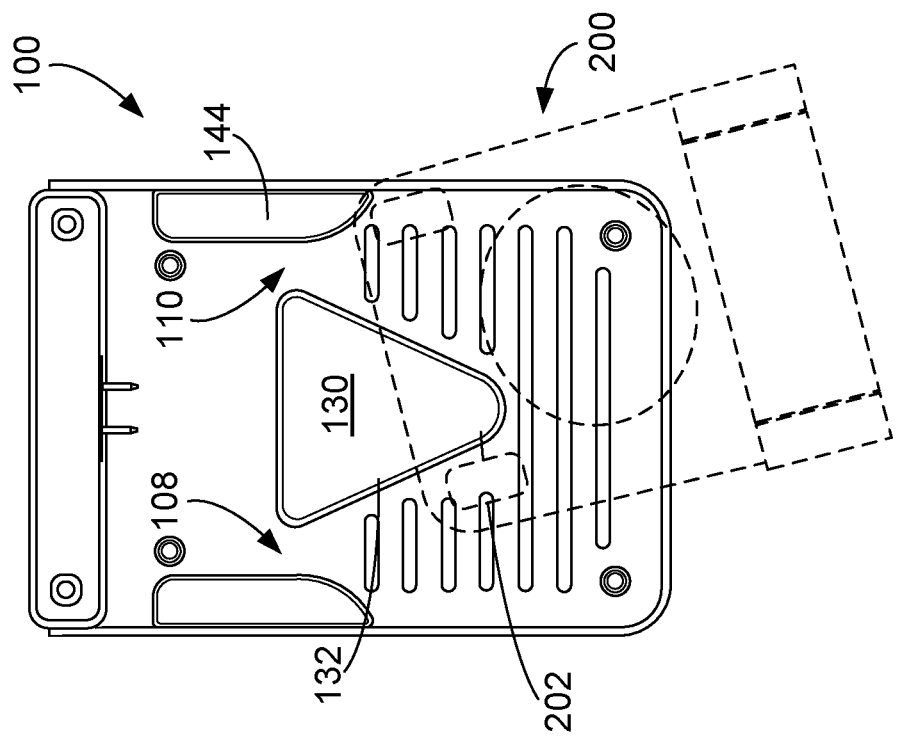
Figure 5D:
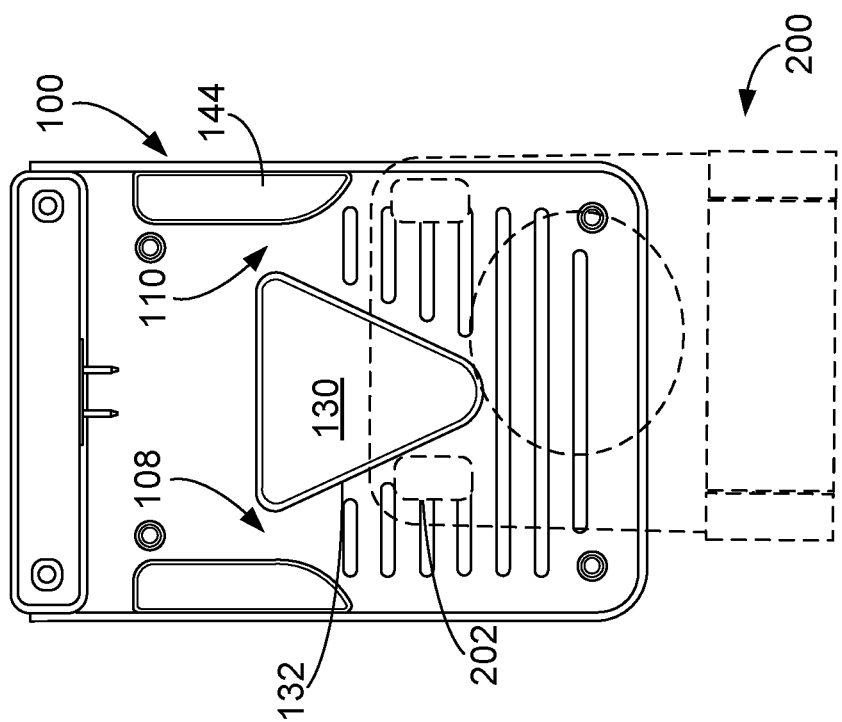
Figure 5G:
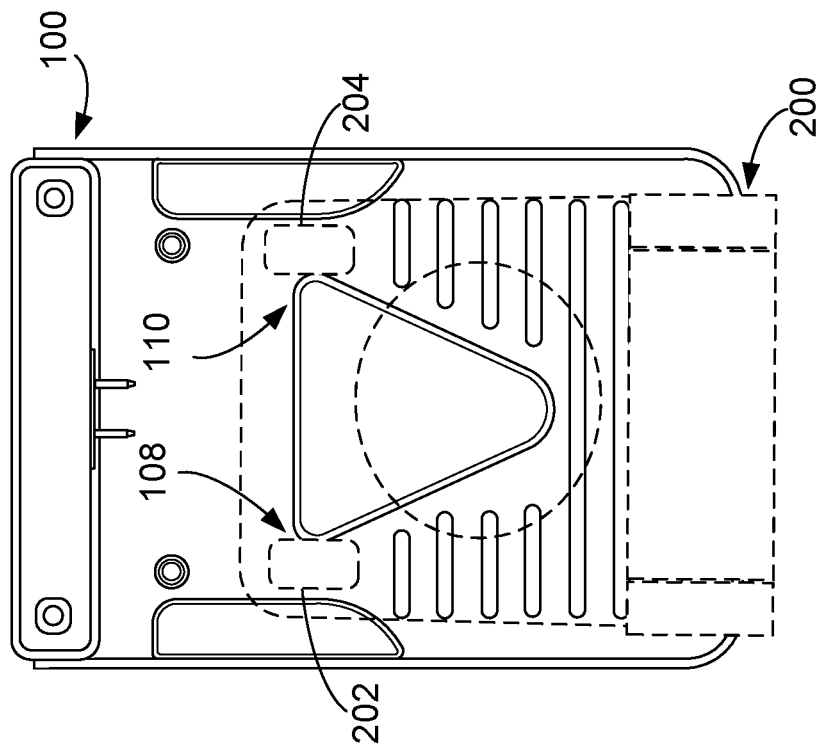
Figure 5F:
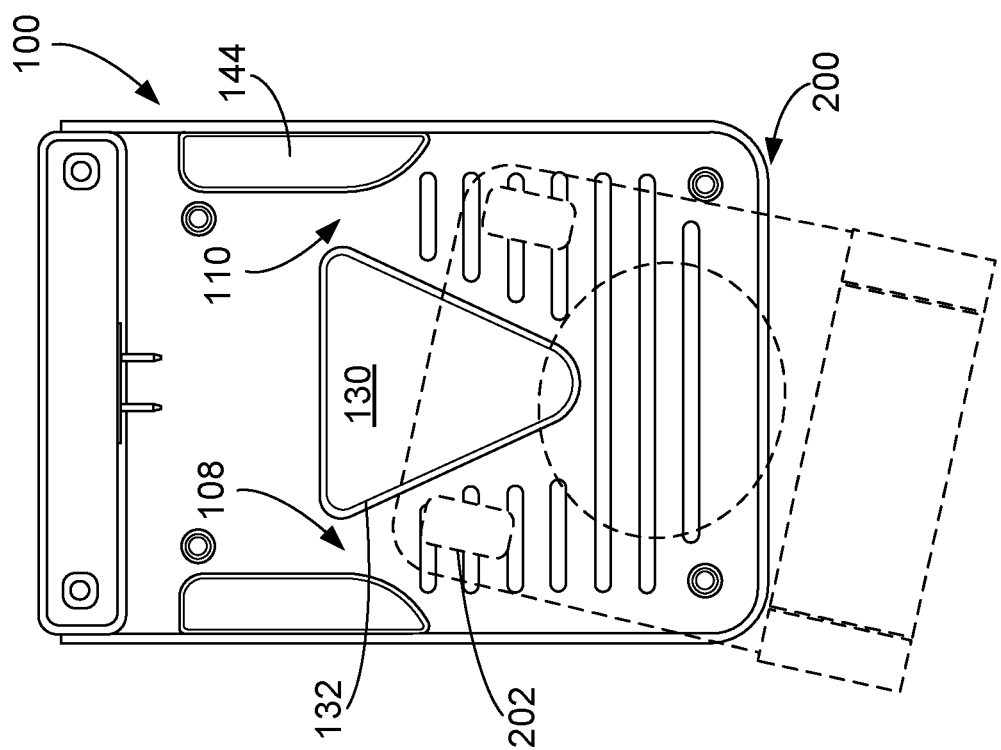

FIGS. 5D-5F illustrate the robotic lawnmower 200 approaching the docking station 100 in such a manner that the left wheel assembly 202 contacts the central guide member 130. In FIG. 5D, the longitudinal axis YR of the robotic lawnmower 200 is parallel to the longitudinal axis YD but is offset to the right of the longitudinal axis YD of the docking station 100. In FIG. 5E, the robotic lawnmower 200 approaches the docking station 100 from the right of the docking station 100. The longitudinal axis YR of the robotic lawnmower 200 and the left lateral surface 132 of the central guide member 130 are both tilted relative to the longitudinal axis YD of the docking station 100 toward the left. The longitudinal axis YR of the robotic lawnmower 200 forms an angle with the longitudinal axis YD of the docking station 100 that is less than the angle between the left lateral surface 132 of the central guide member 130 and the longitudinal axis YD of the docking station 100. In some implementations, in addition to contacting the left lateral surface 132 with the left wheel assembly 202, the robotic lawnmower 200 contacts the right lateral guide member 144 with the right wheel assembly 204. In FIG. 5F, the robotic lawnmower 200 approaches the docking station 100 from the left of the docking station 100. The longitudinal axis YR of the robotic lawnmower 200 intersects with the left lateral surface 132.

In each of the examples illustrated in FIGS. 5D-5F, the left wheel assembly 202 is not aligned with the first channel 108 as the robotic lawnmower 200 approaches the docking station but before the left wheel assembly 202 contacts the left lateral surface 132 of the central guide member. The robotic lawnmower 200 moves in the forward drive direction F in such a manner that the left wheel assembly 202 contacts the left lateral surface 132 of the central guide member 130. The left wheel assembly 202, by contacting the left lateral surface 132, is guided toward the first channel 108. In addition, during this process, the right wheel assembly 204 may also contact the right lateral guide member 144 to further guide the right wheel assembly 204 toward the second channel 110.

Figure 5H:
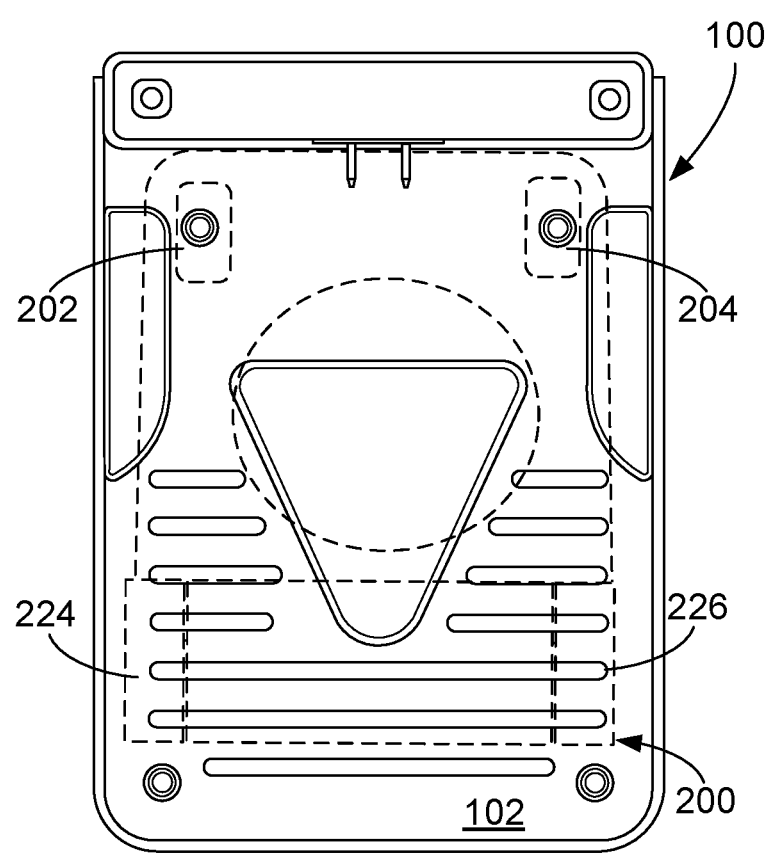

Referring to FIG. 5G, the guidance of the right and left wheel assemblies 202, 204 provided by the guide mechanism 104 can ensure that the first and second channels 108, 110 receive the wheel assemblies 202, 204. As shown in FIG. 5G, with this guidance, the longitudinal axis YR of the robotic lawnmower 200 becomes collinear with the longitudinal axis YD of the docking station 100. This in turn can ensure that the electrical connector 206 (shown in FIG. 3B) of the robotic lawnmower 200 engages with the electrical connector 106 (shown in FIG. 4A) of the docking station 100 when the robotic lawnmower 200 is docked with the docking station 100 as shown in FIG. 5H. Furthermore, as shown in FIG. 5H, the wheel assemblies 202, 204 are supported on the base 102 of the docking station 100. In addition, the drive wheels 224, 226 are also supported on the base 102 of the docking station 100 when the electrical connector 106 of the docking station 100 is engaged with the electrical connector 206 of the docking station 100.

Figure 6A:
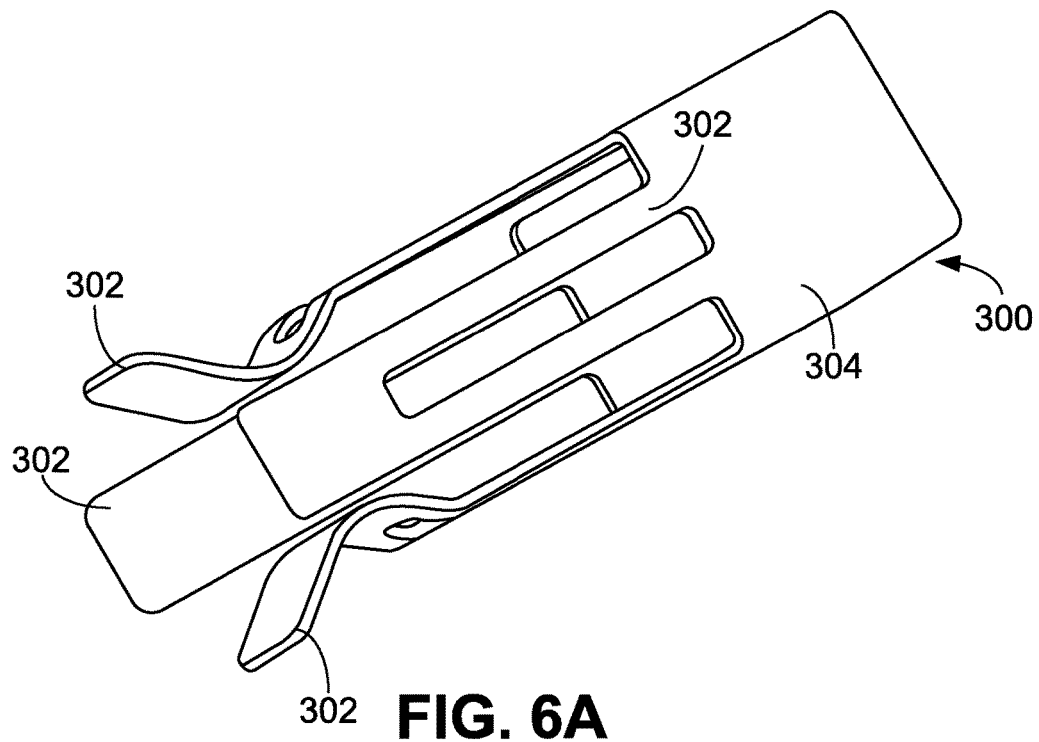
FIGS. 6A-6C are perspective, side, and front views, respectively, of an electrical terminal of an electrical connector.
Figure 6B:
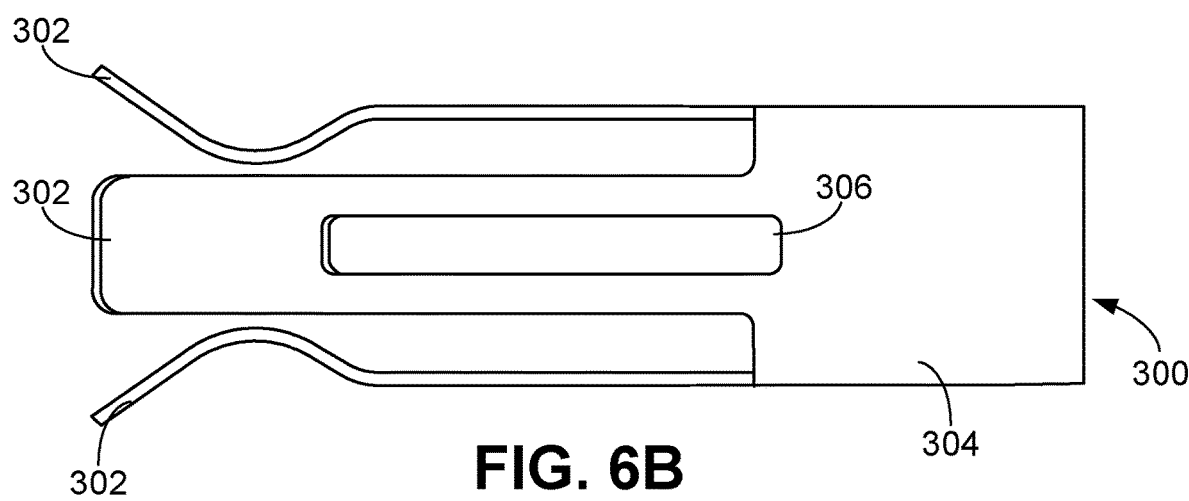
Figure 6C:
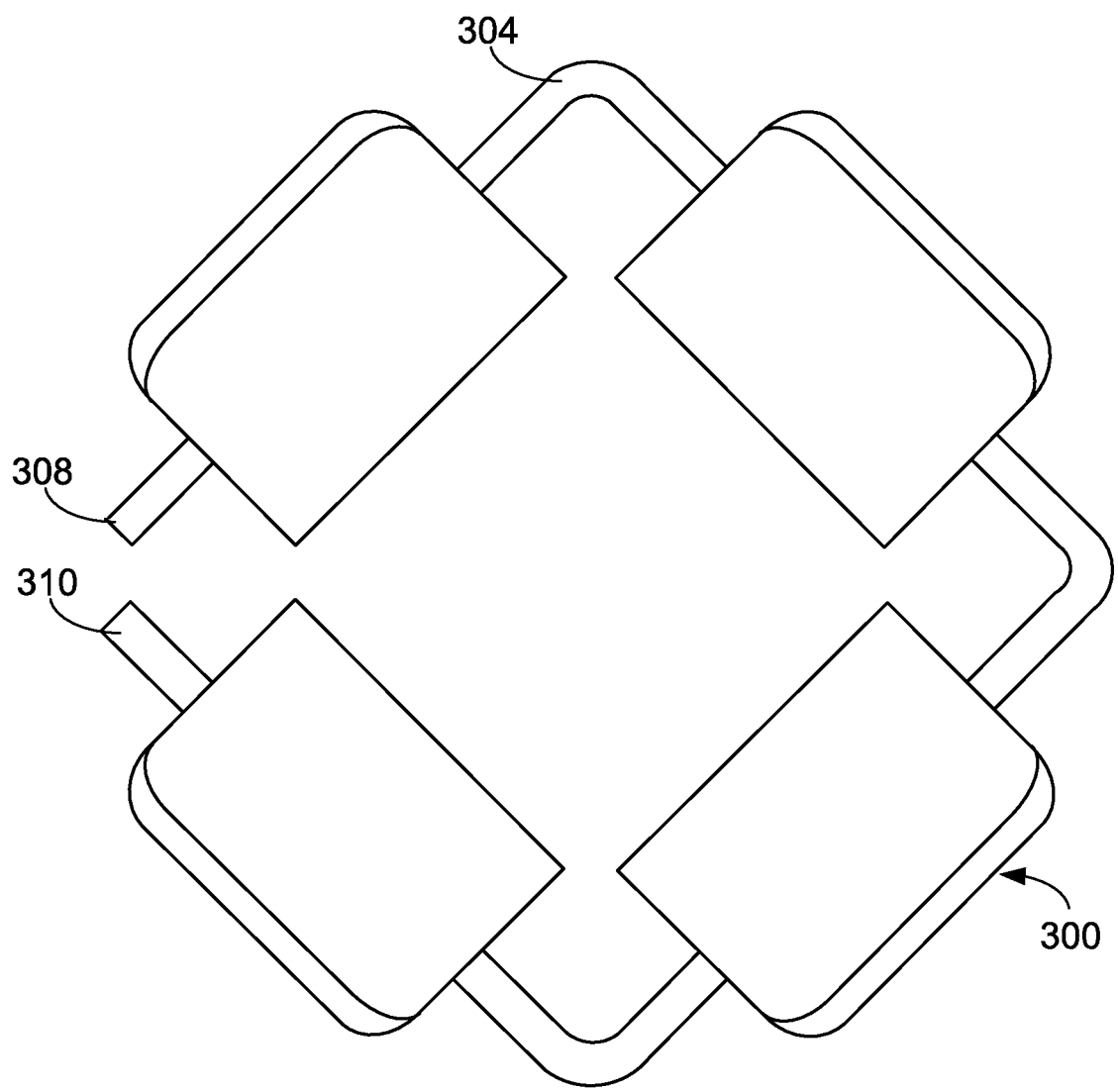

FIGS. 6A-6C illustrate an example of an electrical terminal 300 of the electrical connector 206 of the robotic lawnmower 200. Referring to FIG. 6A, the electrical terminal 300 of the robotic lawnmower 200 includes multiple electrical contacts 302 and a support portion 304. The electrical contacts 302 are elongate and deflectable contact arms. The support portion 304 is substantially fixed in place such that the electrical contacts 302 independently deflect relative to one another. For example, the support portion 304 can be substantially fixed to the body 222 of the robotic lawnmower 200 or to some other structural component of the robotic lawnmower 200.

Referring to FIG. 6B, each of the electrical contacts 302 includes a corresponding cutout 306 extending along at least part of a length of the electrical contact 302. The cutout 306 can be sized and dimensioned to obtain a desired deflectability for the electrical contact 302 and thereby adjust a contact force required to achieve proper contact between the electrical contact 302 and a mating contact. Referring to the example depicted in FIG. 6C, the electrical terminal 300 includes four distinct electrical contacts 302. The electrical contacts 302 are axisymmetric to one another about a central longitudinal axis of the electrical terminal 300. The support portion 304 connects the electrical contacts 302 to one another. In the example shown in FIG. 6C, the support portion 304 includes a first end portion 308 and a second end portion 310 that are disconnected from one another. With such a design, the electrical terminal 300 can be formed from a sheet metal stamping process to decrease the cost of production for the electrical terminal 300.

Figure 7:
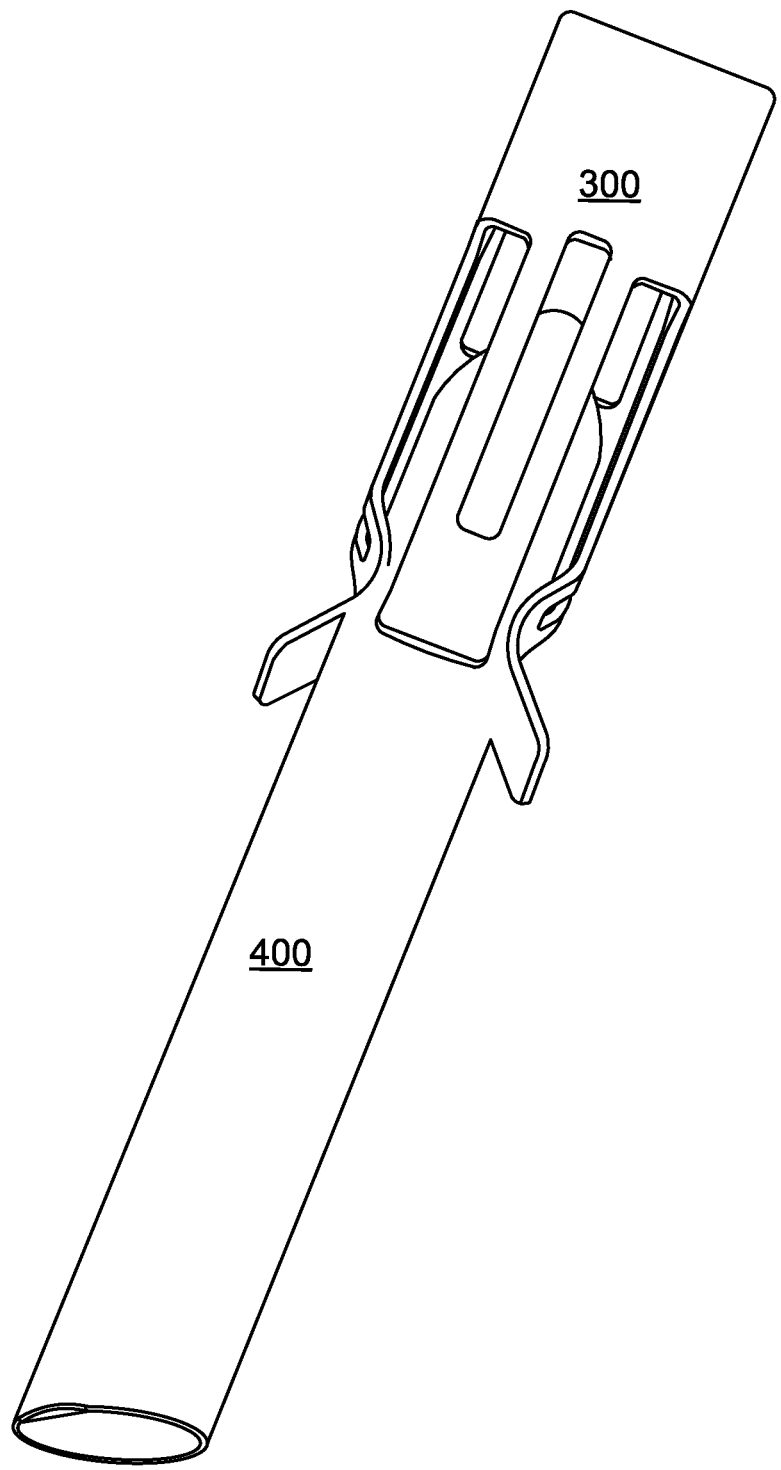
FIG. 7 is a perspective view of electrical terminals mated with one another.

FIG. 7 shows the electrical terminal 300 of the robotic lawnmower 200 mated with a corresponding electrical terminal 400 of the electrical connector 106 of the docking station 100. The electrical terminal 300 can be a female electrical connector, and the electrical connector 400 can be a male electrical connector insertable into the electrical terminal 300. The multiple electrical contacts 302 of the electrical connector 300 provide redundancy such that only contact between a single one of the electrical contacts 302 and the electrical terminal 400 is needed for energy to be delivered from the docking station 100 to the robotic lawnmower 200. When the electrical connector 206 including the electrical terminal 300 is mated with the electrical connector 106 including the electrical terminal 400, the electrical contacts 302 are arranged around the electrical connector 400.

Figure 8:
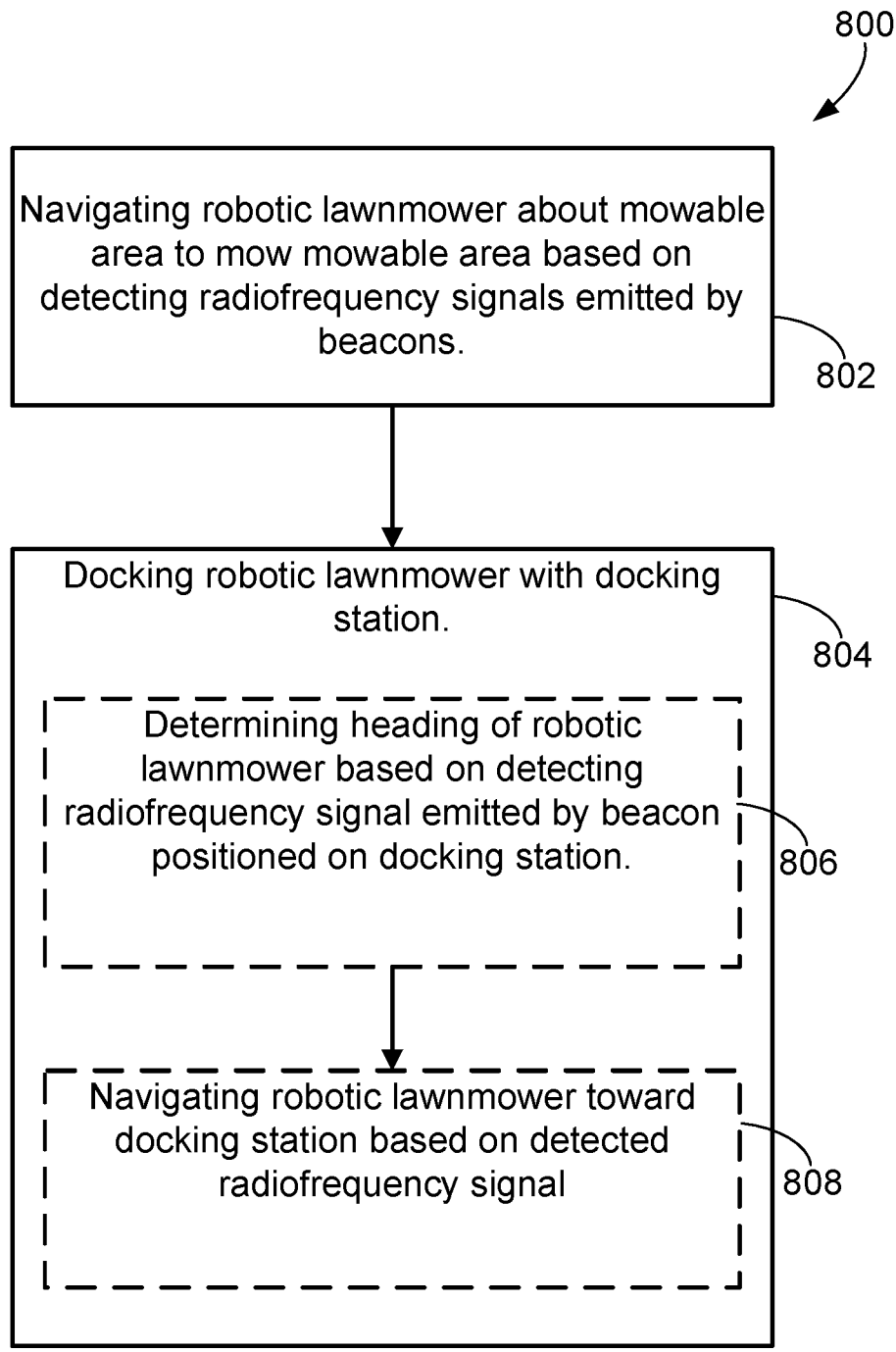
FIG. 8 is a flowchart of a process for docking a robotic lawnmower with a docking station.

FIG. 8 illustrates a process 800 of docking the robotic lawnmower 200 (shown in FIG. 2) with the docking station 100 (shown in FIG. 2). The process 800 can be performed by the robotic lawnmower 200, e.g., by the controller 166 of the robotic lawnmower 200. At an operation 802, the robotic lawnmower 200 performs a mowing operation. The robotic lawnmower 200 is navigated about the mowable area 10 (shown in FIG. 2) to mow the mowable area 10 based on detecting radiofrequency signals emitted by the beacons 20. During this navigation, the robotic lawnmower 200 covers all or part of the mowable area 10. If the mowable area 10 is sufficiently small, the robotic lawnmower 200 can cover an entirety of the mowable area 10 using the energy stored on the battery 236 (shown in FIG. 3A) when the battery 236 is fully charged. If the mowable area 10 is sufficiently large, the robotic lawnmower 200 may be unable to cover the entirety of the mowable area using the energy stored on the battery 236 when the battery 236 is fully charged. In this regard, the robotic lawnmower 200 may return to the docking station 100 only after mowing a portion of the mowable area 10.

The robotic lawnmower 200 detects the radiofrequency signals emitted by the beacons 20 to determine a location of the robotic lawnmower 200 relative to the mowable area 10. The location of the robotic lawnmower 200 can be used determined based on determining times of flight of the radiofrequency signals. The location of the robotic lawnmower 200 can accordingly be triangulated based on these times of flight. In some implementations, during navigation of the robotic lawnmower 200 about the mowable area 10 at the operation 802, one or more beacons on the docking station 100 is used to determine the location of the robotic lawnmower 200. For example, the set of beacons used for determining the location of the robotic lawnmower 200 can include the beacons 30 as well as the beacons 112 on the docking station 100. In other implementations, only the beacons 20 are used during the mowing operation. In some implementations, at the operation 802, an orientation of the robotic lawnmower 200 is determined, e.g., at least in part using a gyroscope of the robotic lawnmower 200, or a position of the robotic lawnmower 200 is determined, e.g., at least in part using an odometer of the robotic lawnmower 200. The robotic lawnmower 200 can be navigated about the mowable area 10 based at least in part on this determined orientation, the determined position, or both.

At an operation 804, the robotic lawnmower 200 performs a docking operation in which the robotic lawnmower 200 is docked with the docking station 100. In some implementations, the robotic lawnmower 200 is unable to precisely determine a location of the robotic lawnmower 200 relative to the docking station 100 based on radiofrequency signals emitted by the beacons 20. As a result, the operation 804 can include sub-operations 806, 808 for more precisely navigating the robotic lawnmower 200 toward the docking station 100. A location of the robotic lawnmower 200 determined based on detecting these radiofrequencies may include an error. As the robotic lawnmower 200 approaches the docking station 100, the difference between the error and the distance between the robotic lawnmower 200 and the docking station 100 decreases. As a result, when the error is sufficiently similar to the distance, e.g., at least 10%, at least 20%, or at least 30% of the distance, the robotic lawnmower 200 determines its heading based on detecting the radiofrequency signal emitted by the beacon of the docking station 100 rather than based on detecting the radiofrequency signals emitted by the beacons 20. This heading determination can be used to more robustly navigate the robotic lawnmower 200 to the docking station 100 than if the radiofrequency signals of the beacons 20 alone were used.

At the sub-operation 806, a heading of the robotic lawnmower 200 is determined based on detecting a radiofrequency signal emitted by a beacon positioned on the docking station 100, e.g., one of the beacons 112 shown in FIG. 2. In some cases, the heading is determined based on detecting radiofrequency signals emitted by multiple beacons positioned on the docking station 100, e.g., using both of the beacons 112. At the sub-operation 808, the robotic lawnmower 200 is navigated toward the docking station 100 based on the radiofrequency signal detected at the sub-operation 806. In some implementations, a distance between the docking station 100 and the robotic lawnmower 200 is determined at the sub-operation 806, and the robotic lawnmower 200 is navigated based on the determined distance at the sub-operation 808. For example, the distance can correspond to a distance between the sensor system 220 of the robotic lawnmower 200 and a beacon of the docking station 100, e.g., one of the beacons 112. In some implementations, if the docking station 100 includes more than one beacon, e.g., the beacons 112, a distance between the robotic lawnmower 200 and each of the more than one beacon is determined. In some implementations, both the heading and the distance are determined. In some implementations, at the sub-operation 806, an orientation of the robotic lawnmower 200 is determined at the sub-operation 806, e.g., at least in part using a gyroscope of the robotic lawnmower 200, or a position of the robotic lawnmower 200 is determined, e.g., at least in part using an odometer of the robotic lawnmower 200. At the sub-operation 808, the robotic lawnmower 200 can be navigated toward the docking station 100 based at least in part on this determined orientation, the determined position, or both. In this regard, in some implementations, one or more of a heading of the robotic lawnmower 200 relative to the docking station 100, a distance between the robotic lawnmower 200 relative to the docking station 100, an odometry-based position of the robotic lawnmower 200, or a gyroscope-based orientation of the robotic lawnmower 200 can be determined at the sub-operation 806 and then used at the sub-operation 808 for navigation toward the docking station 100 and docking with the docking station 100.

In some implementations, the operation 804 further includes a sub-operation in which the robotic lawnmower 200 is navigated toward the docking station 100 based on detecting the radiofrequency signals emitted by the beacons 20. Similar to the operation 802, this sub-operation operation uses the radiofrequency signals for determining the location of the robotic lawnmower 200 relative to the mowable area 10. The sub-operation 806 can be initiated after the robotic lawnmower 200 is navigated toward the docking station 100 based on detecting the radiofrequency signals emitted by the beacons 20. For example, this sub-operation 806 can be initiated when the error is sufficiently similar to the distance between the robotic lawnmower 200 and the docking station 100. The error can be at least 10%, at least 20%, or at least 30% of the distance between the robotic lawnmower 200 and the docking station 100.

In other implementations, the sub-operation 806 is initiated after the robotic lawnmower 200 is within a first threshold distance from the docking station 100. For example, the sub-operation 806 is initiated when the robotic lawnmower 200 is within 0.5 to 3 meters of the docking station, e.g., within 0.5 to 2 meters, within 1 to 2.5 meters, within 1.5 to 3 meters, within about 1 meter, within about 2 meters, within about 3 meters. In further implementations, the sub-operation 806 is initiated after the robotic lawnmower 200 is aligned with an approach vector of the docking station 100, e.g., aligned with the longitudinal axis YD of the docking station 100. For example, the robotic lawnmower 200 can be aligned with the approach vector of the docking station 100 when at least a portion of the robotic lawnmower 200 is along the approach vector. In some implementations, the robotic lawnmower 200 can be aligned with the approach vector of the docking station 100 when a portion of the robotic lawnmower 200 along the longitudinal axis YR of the robotic lawnmower 200 is positioned along the approach vector, e.g., a front center of the robotic lawnmower 200, a center of the robotic lawnmower 200, or a rear center of the robotic lawnmower 200. In some implementations, the sub-operation 806 is initiated when the robotic lawnmower 200 is within the threshold distance of the docking station 100 and when the robotic lawnmower 200 is aligned with the approach vector of the docking station 100.

In some implementations, during the navigation of the robotic lawnmower 200 toward the docking station 100, e.g., of sub-operation 808, the robotic lawnmower 200 is first navigated toward the docking station 100 based on at least in part on both the determined heading and the determined distance when the robotic lawnmower 200 is within the first threshold distance, and then is navigated toward the docking station 100 based at least in part on one of the determined heading and the determined distance when the robotic lawnmower 200 is within a second threshold distance. When the robotic lawnmower 200 is within the second threshold distance, a position determined using the odometer of the robotic lawnmower 200, an orientation determined using the gyroscope of the robotic lawnmower 200, or both can be used for navigating toward and docking with the docking station 100. The second threshold distance is less than the first threshold distance. For example, the second threshold distance can be between 0.1 and 2 meters, e.g., between 0.1 and 1 meters, between 0.5 and 1.5 meters, or about 1 meter. When the robotic lawnmower 200 is within the second threshold distance, the error associated with the determined distance may be too high for precise navigation toward the docking station 100. The robotic lawnmower 200 is accordingly navigated toward the docking station 100 based on the heading alone. In this regard, during the docking operation, the navigation of the robotic lawnmower 200 can include (i) a first portion in which the robotic lawnmower 200 is navigated toward the docking station 100 such that the robotic lawnmower 200 is aligned with the approach vector of the docking station, (ii) a second portion in which the robotic lawnmower 200 is navigated toward the docking station 100 based on the determined heading and the determined distance when the robotic lawnmower 200 is within the first threshold distance but beyond the second threshold distance, and (iii) a third portion in which the robotic lawnmower 200 is navigated toward and then docked with the docking station 100 based on the determined heading alone when the robotic lawnmower 200 is within the second threshold distance.

In some implementations, during the navigation toward the docking station 100, mechanical alignment between the robotic lawnmower 200 and the docking station 100 can be used. For example, the wheel assemblies 202, 204 of the robotic lawnmower 200 can engage with the guide mechanism 104 in the manner described herein. This mechanical alignment can occur when the robotic lawnmower 200 is within a third threshold distance less than the second threshold distance. This mechanical alignment can occur during the third portion of the navigation. In other words, the robotic lawnmower 200 can continue to use the determined heading, the determined position, the determined orientation, or a combination thereof for navigating toward and docking with the docking station 100. The guide mechanism 104 can be positioned such that the third threshold distance is between 0.1 and 1 meter, e.g., between 0.1 and 0.5 meters, between 0.3 and 0.7 meters, between 0.5 and 1 meter, or about 0.5 meters. The robotic lawnmower 200 is navigated such that, if the robotic lawnmower 200 is misaligned with the docking station 100, the left portion 204L of the right wheel assembly 204 of the robotic lawnmower 200 contacts the central guide member 130 of the docking station 100 (as illustrated in FIGS. 5A-5C) or the right portion 202R of the left wheel assembly 202 of the robotic lawnmower 200 contacts the central guide member 130 of the docking station 100 (as illustrated in FIGS. 5D-5F). In further implementations, during the navigation of the robotic lawnmower 200 toward the docking station 100, the robotic lawnmower 200 is rotated based on the determined heading such that the forward drive direction F (depicted in FIG. 1) is aligned with the longitudinal axis YR (shown in FIG. 1) of the docking station 100 along which the electrical connector 106 is positioned. In some implementations, the wheel assemblies 202, 204 of the robotic lawnmower 200 engage with the guide mechanism 104 during the third portion of the navigation of the robotic lawnmower 200 in the docking operation described herein.

A drive system of the robotic lawnmower 200 is deactivated when the robotic lawnmower 200 is docked with the docking station 100. The drive system can be deactivated in response to a sensor of the robotic lawnmower 200 that detects that the robotic lawnmower 200 is docked with the docking station 100. In some implementations, the sensor includes a contact sensor of the robotic lawnmower 200 that can detect contact between the body 222 of the robotic lawnmower 200 and the docking station 100. For example, the sensor can detect contact between the bumper of the robotic lawnmower 200 and the docking station 100. The drive system, in some cases, is deactivated after contact is detected for a predefined amount of time, e.g., for at least 0.5 seconds, at least 1 second, at least 1.5 seconds, or more. In other implementations, the sensor includes, in addition to or rather than the contact sensor, an electrical characteristic sensor. The electrical characteristic sensor can detect a voltage, current, or frequency of an electrical signal transmitted to electrical connector 106 of the docking station 100. The electrical characteristic sensor can be coupled to the electrical connector 106 when the robotic lawnmower 200 is docked with the docking station 100 but before the docking station 100 transmits energy to recharge the battery 236 of the robotic lawnmower 200. The drive system, in some cases, is deactivated after the electrical characteristic is detected by the sensor for a predefined amount of time, e.g., for at least 0.5 seconds, at least 1 second, at least 1.5 seconds, or more. In some implementations, the docking station 100 only transmits energy to the docking station 100 after the drive system is deactivated, e.g., after the predefined amount of time that the contact sensor detects contact or after the predefined amount of time that the electrical characteristic sensor detects the electrical characteristic.

In some implementations, to undock from the docking station 100, the robotic lawnmower 200 first moves away from, e.g., reverses away from, the docking station 100 while being guided by the guide mechanism 104. After the robotic lawnmower 200 moves beyond the guide mechanism 104, the robotic lawnmower 200 is navigated away from the docking station 100 based on a determined heading of the robotic lawnmower 200 relative to the docking station 100. The heading can be determined in a manner similar to how the heading is determined at the sub-operation 806. During this portion of the navigation away from the docking station 100, an odometer-based position, a gyroscope-based orientation, or both can be determined to move the robotic lawnmower 200 away from the docking station 100. The robotic lawnmower 200 can continue to be navigated away from the docking station 100 until the robotic lawnmower 200 reaches a threshold distance, e.g., the second threshold distance described herein. When the robotic lawnmower 200 moves beyond the second threshold distance, the robotic lawnmower 200 is navigated such that its forward drive direction is directed away from the docking station 100. In some implementations, the robotic lawnmower 200 is turned substantially 180 degrees, e.g., turned 170 to 190 degrees. After the robotic lawnmower 200 is turned away from the docking station 100, the robotic lawnmower 200 can be navigated about the mowable area 10 in the manner described with respect to the operation 802, e.g., to perform a mowing operation.

A number of implementations have been described. Nevertheless, it will be understood that various modifications may be made.

While the overall width W1 of the docking station 100 is described as being between 100% and 125% of the overall width W2 of the robotic lawnmower 200, in other implementations, the relative widths of the docking station 100 and the robotic lawnmower 200 can vary. For example, in some implementations, the robotic lawnmower 200 has a width greater than a width of the docking station 100. The width of the robotic lawnmower 200 can be 100% to 125% or more of the overall width of the docking station 100. In some implementations, the overall width of the docking station 100 can be 125% or more of the width of the robotic lawnmower 200.

While the wheel assemblies 202, 204 are described as caster wheels, in some implementations, the wheel assemblies 202, 204 are powered wheel assemblies that are driven by one or more actuators of the robotic lawnmower 200. While the robotic lawnmower 200 is described as including two wheel assemblies 202, 204, in other implementations, the robotic lawnmower 200 includes a single caster wheel assembly. In further implementations, the robotic lawnmower 200 includes three or more caster wheel assemblies.

The wheel assemblies 202, 204 are described as being positioned along a forward portion of the robotic lawnmower 200. In some implementations, the wheel assemblies 202, 204 are located along a rearward portion of the robotic lawnmower 200, and the robotic lawnmower 200, rather than moving in the forward drive direction F to dock with the docking station 100, moves in a rearward drive direction to dock with the docking station 100. The electrical connector 206 of the robotic lawnmower 200 can be located along the rearward portion 234 of the robotic lawnmower 200.

While FIG. 4A depicts the docking station 100 with four distinct support members 124, in some implementations, the docking station 100 includes one, two, three, or five or more support members. The support members 124 are depicted in FIG. 4A as being disposed symmetrically about the longitudinal axis YD. In other implementations, the support members 124 are disposed axisymmetrically about a central vertical axis of the docking station 100, e.g., a vertical axis located at a positional center of the docking station 100. The docking station 100, in some implementations, does not include support members.

In some implementations, the base 102 is sufficiently large to support each of the wheels 212, 214 and the drive wheels 224, 226 above the mowable area. For example, the base 102 can have a maximum width that is at least 100% to 125% of a maximum width between any two of the wheels 212, 214 and the drive wheels 224, 226, and a maximum length that is at least 100% to 125% of a maximum length between any two of the wheels 212, 214 and the drive wheels 224, 226. In other implementations, the base 102 is sufficiently large to support only the wheels 212, 214. For example, the maximum length of the base 102 is less than 100%, e.g., less than 90%, less than 80%, less than 70%, of the maximum length between the left wheel 212 and the left drive wheel 224 or between the right wheel 214 and the right drive wheel 226.

While the base 102 is described as having a substantially rectangular prismatic shape, in other implementations, the base 102 may have another appropriate shape, such as a substantially triangular prismatic shape or other substantially polygonal prismatic shape. In other implementations, the base 102 can have a substantially cylindrical shape.

The docking station 100 is described as being supportable on a surface of the mowable area 10. In other implementations, the docking station 100 can be supportable on a surface proximate the mowable area 10, e.g., a surface of another mowable area or a non-mowable area proximate the mowable area. The surface can be outside of the boundary 30 of the mowable area 10. In this regard, the robotic lawnmower 200, when navigating toward the docking station 100, can be navigated along a region outside of the mowable area 10 to arrive at the docking station 100. In some implementations, the robotic lawnmower 200 is positioned within 0.1 to 1 meters of the boundary 30 of the mowable area 10.

The beacons 112, in some implementations, are at least partially contained within an enclosure of the docking station 100, e.g., within the backstop 114. In other implementations, one or more antennae bodies extend from the backstop 114, and at least part of the beacons 112 are positioned outside of the enclosure of the docking station 100 within the one or more antennae bodies. In some implementations, the beacons 112 are removable from the rest of the docking station 100 so that they can be easily replaced.

The central guide member 130 is described as having a substantially triangular prismatic portion in some implementations. In other implementations, rather than including a central guide member that includes the left lateral surface 132 and the right lateral surface 134, the docking station 100 can include two disjoint raised portions along the base 102, one of which includes the left lateral surface 132, and the other of which includes the right lateral surface 134. The rear lateral surface 136 can be present in some implementations, e.g., as part of another disjoint raised portion along the base 102, or can be absent in other implementations.

While the left and right lateral surfaces 132, 134 are described as being substantially planar, in other implementations, one or both of the left and right lateral surfaces 132, 134 are curved surfaces. In some implementations, the features that guide the left and right wheel assemblies 202, 204 are distinct series of connected lateral surfaces, including a combination of substantially planar and curved surfaces.

While the robotic lawnmower 200 is described as including an electrical connector 206 and the docking station 100 is described as including an electrical connector 106, in some implementations, the robotic lawnmower 200 and the docking station 100 do not include electrical connectors. The robotic lawnmower 200 and the docking station 100 can include a wireless charging system that enables the docking station 100 to wirelessly charge the robotic lawnmower 200 when the robotic lawnmower 200 is docked with the docking station 100. The wireless charging system includes a first set of coils on the docking station 100 and a second set of coils on the robotic lawnmower 200. Through inductive charging using the first and second set of coils, the battery 236 of the robotic lawnmower 200 can be charged. In some implementations, the robotic lawnmower 200 and the docking station 100 include the electrical connectors 106, 206 and the wirelessly charging system. The robotic lawnmower 200 can be wirelessly charged by the docking station 100 or can be charged using the electrical connectors 106, 206.

The cutting assemblies 216, 218 are described as height-adjustable in certain implementations. In some implementations, a height of the cutting assemblies 216, 218 can be increased while the robotic lawnmower 200 is performing the docking operation. This increased height can reduce the risk that the cutting assemblies 216, 218 contact portions of the docking station 100 while the robotic lawnmower 200 is docking with the docking station 100.

The electrical connectors 106, 206 are described as being positioned along vertically extending surfaces of the docking station 100 and the robotic lawnmower 200, e.g., along forward facing surfaces of the docking station 100 and the robotic lawnmower 200. In other implementations, the electrical connectors 106, 206 are positioned along horizontally extending surfaces of the docking station 100 and the robotic lawnmower 200, e.g., along an upward facing surface of the docking station 100 and a downward facing surface of the robotic lawnmower 200. Furthermore, while the robotic lawnmower 200 is described as docking with the docking station 100 by moving in the forward drive direction F, in other implementations, the robotic lawnmower 200 reverses into the docking station 100. The electrical connector 206 can be positioned along a rearward surface of the robotic lawnmower 200.

While the robotic lawnmower 200 is shown as having a female electrical connector, e.g., the electrical connector 206, and the docking station 100 is shown as having a male electrical connector, e.g., the electrical connector 106, in other implementations, the robotic lawnmower 200 can have a male electrical connector similar to the electrical connector 106 and the docking station 100 can have a female electrical connector similar to the electrical connector 206.

The battery 236 is described as being mounted to the bottom portion of the robotic lawnmower 200. In other implementations, the battery 236 can be mounted to other portions of the robotic lawnmower 200. For example, the battery 236 can be mounted to a lateral portion, a front portion, a back portion, or a top portion of the robotic lawnmower 200.

While the electrical terminal 300 is described as having four or more deflectable contact arms, in other implementations, the electrical terminal 300 can include fewer or more deflectable contact arms. In some implementations, the electrical terminal 300 includes two, three, five, or more deflectable contact arms.

The autonomous mobile robots described herein can be controlled, at least in part, using one or more computer program products, e.g., one or more computer programs tangibly embodied in one or more information carriers, such as one or more non-transitory machine-readable media, for execution by, or to control the operation of, one or more data processing apparatus, e.g., a programmable processor, a computer, multiple computers, and/or programmable logic components.

Operations associated with controlling the autonomous mobile robots described herein can be performed by one or more programmable processors executing one or more computer programs to perform the functions described herein. A computer program can be written in any form of programming language, including compiled or interpreted languages, and it can be deployed in any form, including as a stand-alone program or as a module, component, subroutine, or other unit suitable for use in a computing environment. Control over all or part of the robots described herein can be implemented using special purpose logic circuitry, e.g., an FPGA (field programmable gate array) and/or an ASIC (application-specific integrated circuit).

The controllers described herein can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Accordingly, other implementations are within the scope of the claims.

What is claimed is:

1. A docking station for a robotic lawnmower, the docking station comprising:
    a base;
    an electrical connector above the base, the electrical connector positioned along a longitudinal axis of the docking station;
    a central guide member positioned on the base and along the longitudinal axis, the central guide member comprising:
        a right lateral surface extending away from the longitudinal axis and toward the electrical connector from a first end portion proximate the longitudinal axis to a second end portion, and
        a left lateral surface extending away from the longitudinal axis and toward the electrical connector from a first end portion proximate the longitudinal axis to a second end portion,
        wherein a maximum width of the central guide member is between 90% and 100% of a minimum width between wheels of the robotic lawnmower;
    a right lateral guide member positioned on the base and adjacent to a right edge of the base, the right lateral guide member and the central guide member at least partially defining a right channel positioned between the right lateral guide member and the central guide member and extending along the base; and
    a left lateral guide member positioned on the base and adjacent to a left edge of the base, the left lateral guide member and the central guide member at least partially defining a left channel positioned between the left lateral guide member and the central guide member and extending along the base, wherein the central guide member is positioned between the right lateral guide member and the left lateral guide member.

2. The docking station of claim 1, wherein an angle between the right lateral surface and the longitudinal axis is between 15 and 45 degrees.

3. The docking station of claim 1, wherein the central guide member comprises a rearward surface extending from proximate the second end portion of the right lateral surface to proximate the second end portion of the left lateral surface, the rearward surface defining a plane substantially perpendicular to the longitudinal axis.

4. The docking station of claim 1, further comprising a plurality of elongate support members extending downwardly from the base, a first of the plurality of elongate support members being positioned along a front-right portion of the base, a second of the plurality of elongate support members being positioned along a front-left portion of the base, a third of the plurality of elongate support members being positioned along a rear-right portion of the base, and a fourth of the plurality of elongate support members being positioned along a rear-left portion of the base.

5. The docking station of claim 4, wherein a perimeter of the base is substantially rectangular, and the first, second, third, and fourth of the plurality of elongate support members are positioned proximate first, second, third, and fourth corners of the perimeter of the base, respectively.

6. The docking station of claim 1, wherein the central guide member is substantially symmetric about the longitudinal axis.

7. The docking station of claim 1, wherein the right lateral guide member and the left lateral guide member are symmetric to one another about the longitudinal axis.

8. The docking station of claim 1, further comprising a backstop extending vertically from the base, wherein the electrical connector is positioned along a front facing surface of the backstop.

9. The docking station of claim 8, further comprising a beacon for emitting a radiofrequency signal, the beacon being positioned on top of the backstop.

10. The docking station of claim 8, wherein the front facing surface of the backstop extends along a plane perpendicular to a plane along which a top surface of the base extends.

11. The docking station of claim 1, wherein:
the right lateral guide member comprises a front curved surface extending laterally toward the longitudinal axis away from the right edge of the base; and
the left lateral guide member comprises a front curved surface extending laterally toward the longitudinal axis away from the left edge of the base.

12. The docking station of claim 11, wherein:
the right lateral guide member comprises a lateral planar surface extending rearward from the front curved surface of the right lateral guide member toward the electrical connector; and
the left lateral guide member comprises a lateral planar surface extending rearward from the front curved surface of the left lateral guide member toward the electrical connector.

13. The docking station of claim 11, wherein the front curved surface of the right lateral guide member and the front curved surface of the left lateral guide member extend vertically from the base.

14. The docking station of claim 1, wherein:
the right lateral guide member comprises a rearward facing planar surface extending laterally from proximate the right edge of the base toward the longitudinal axis; and
the left lateral guide member comprises a rearward facing planar surface extending laterally from proximate the left edge of the base toward the longitudinal axis.

15. The docking station of claim 14, wherein a backstop of the docking station and the rearward facing surface of the right lateral guide member at least partially define a rearward right channel extending from a central collection well to the right edge of the base, and the backstop and the rearward facing surface of the left lateral guide member at least partially define a rearward left channel extending from the central collection well to the left edge of the base.

16. The docking station of claim 1, wherein a distance between a forwardmost portion of the central guide member and a forwardmost portion of the base is 20% to 40% of an overall length of the docking station.

17. The docking station of claim 1, wherein a maximum width between the right lateral surface of the central guide member and the left lateral surface of the central guide member is between 40% and 60% of an overall width of the docking station.

18. The docking station of claim 1, wherein an overall width of the docking station is between 100% and 125% of an overall width of the robotic lawnmower.

19. A system comprising:
a docking station comprising an electrical connector configured to interface with an electrical connector of a robotic lawnmower, the docking station comprising a guide mechanism configured to
contact a right portion of a left wheel assembly of the robotic lawnmower to move the left wheel assembly leftward such that the electrical connector of the robotic lawnmower aligns with the electrical connector of the docking station, and
contact a left portion of a right wheel assembly of the robotic lawnmower to move the right wheel assembly rightward such that the electrical connector of the robotic lawnmower aligns with the electrical connector of the docking station.

20. A method of docking a robotic lawnmower with a docking station, the method comprising:
navigating the robotic lawnmower about a mowable area to mow the mowable area based on detecting radiofrequency signals emitted by a plurality of beacons; and
docking the robotic lawnmower with the docking station, wherein docking the robotic lawnmower comprises:
determining a heading of the robotic lawnmower relative to the docking station based on detecting a radiofrequency signal emitted by a beacon positioned on the docking station, and
navigating the robotic lawnmower toward the docking station based on the determined heading.

21. The method of claim 20, wherein:
docking the robotic lawnmower with the docking station further comprises first navigating the robotic lawnmower toward the docking station based on detecting the radiofrequency signals emitted by the plurality of beacons, and
navigating the robotic lawnmower toward the docking station based on the determined heading comprises navigating the robotic lawnmower toward the docking station based on the determined heading after navigating the robotic lawnmower toward the docking station based on detecting the radiofrequency signals emitted by the plurality of beacons.

22. The method of claim 20, wherein the robotic lawnmower comprises a plurality of transceivers, and determining the heading of the robotic lawnmower comprises determining the heading of the robotic lawnmower based on detecting the emitted radiofrequency signal using the plurality of transceivers.

23. The method of claim 20, wherein navigating the robotic lawnmower toward the docking station comprises navigating the robotic lawnmower such that, if the robotic lawnmower is misaligned with the docking station, a left portion of a right wheel assembly of the robotic lawnmower contacts a first portion of the docking station or a right portion of a left wheel assembly of the robotic lawnmower contacts a second portion of the docking station.

24. The method of claim 20, wherein a first subset of the plurality of beacons comprises the beacon, and the plurality of beacons further comprises a second subset of the plurality of beacons, the second subset of the plurality of beacons being physically remote from the docking station.

25. The method of claim 20, wherein navigating the robotic lawnmower toward the docking station comprises rotating the robotic lawnmower based on the determined heading such that a forward drive direction of the robotic lawnmower aligns with a longitudinal axis of the robotic lawnmower docking station along which an electrical connector of the docking station is positioned.

26. The method of claim 20, wherein the radiofrequency signal is a first radiofrequency signal, and the beacon is a first beacon,
wherein determining the heading of the robotic lawnmower relative to the docking station based on detecting the first radiofrequency signal emitted by the first beacon positioned on the docking station comprises:
determining the heading of the robotic lawnmower relative to the docking station based on detecting the first radiofrequency signal emitted by the first beacon positioned on the docking station and a second radiofrequency signal emitted by a second beacon positioned on the docking station.

27. The method of claim 20, wherein docking the robotic lawnmower comprises determining a distance between the robotic lawnmower and the beacon, and
wherein navigating the robotic lawnmower toward the docking station based on the determined heading comprises navigating the robotic lawnmower toward the docking station based on the determined heading and the determined distance.

28. The method of claim 20, wherein the beacon is positioned above a base of the docking station configured to support at least a portion of the robotic lawnmower above the lawn.

29. The method of claim 28, wherein the beacon is positioned on top of a backstop of the docking station.

30. The system of claim 19, wherein:
configurations of the guide mechanism to contact the right portion of the left wheel assembly comprise configurations to contact the left wheel assembly such that the left wheel assembly rotates about a first substantially vertical axis to align with a first channel along a base of the docking station, and
configurations of the guide mechanism to contact the left portion of the right wheel assembly comprise configurations to contact the right wheel assembly such that the right wheel assembly rotates about a second substantially vertical axis to align with a second channel along the base of the docking station.

31. The system of claim 19, wherein:
the electrical connector of the docking station is positioned along a longitudinal axis of the docking station,
the guide mechanism comprises a guide member comprising a first surface configured to contact the right portion of the left wheel assembly and a second surface configured to contact the left portion of the right wheel assembly, and
the first surface and the second surface are nonparallel to one another and nonparallel to the longitudinal axis of the docking station.

32. The system of claim 31, wherein an angle between the first surface and the longitudinal axis of the docking station is between 15 and 45 degrees.

33. The system of claim 19, wherein the guide mechanism comprises a guide member comprising a substantially triangular prismatic portion configured to contact the right portion of the left wheel assembly and configured to contact the left portion of the right wheel assembly.

34. The system of claim 19, wherein a height of the guide mechanism relative to a base of the docking station is at least 2 centimeters.

* * * * *